United States Patent [19]
Jaeger et al.

[11] Patent Number: 5,982,355
[45] Date of Patent: Nov. 9, 1999

[54] MULTIPLE PURPOSE CONTROLS FOR ELECTRICAL SYSTEMS

[76] Inventors: Denny Jaeger, 6120 Valley View Rd., Oakland, Calif. 94611; Kenneth M. Twain, 4209 Thompkins Ave., Oakland, Calif. 94619

[21] Appl. No.: 08/917,094

[22] Filed: Aug. 25, 1997

Related U.S. Application Data

[63] Continuation-in-part of application No. 08/644,888, May 10, 1996, abandoned, and a continuation-in-part of application No. 08/420,438, Apr. 10, 1995, Pat. No. 5,572,239, which is a continuation of application No. 08/225,782, Apr. 11, 1994, abandoned, which is a continuation-in-part of application No. 08/147,545, Nov. 5, 1993, abandoned.

[51] Int. Cl.$^6$ ........................................ G09G 5/08
[52] U.S. Cl. ............................. 345/161; 345/172
[58] Field of Search ................... 345/161, 172, 345/170, 171, 173, 184, 168, 160, 169, 157, 156; 341/22, 23, 28, 33, 34; 74/471 XY; 273/148 B, 438; 200/6 A

[56] References Cited

U.S. PATENT DOCUMENTS

| | | | |
|---|---|---|---|
| 5,160,918 | 11/1992 | Saposnik et al. | 345/161 |
| 5,250,930 | 10/1993 | Yoshida et al. | 345/161 |
| 5,418,760 | 5/1995 | Kawashima et al. | 345/173 |
| 5,640,179 | 6/1997 | Lake | 345/161 |

*Primary Examiner*—Regina Liang
*Attorney, Agent, or Firm*—Harris Zimmerman

[57] ABSTRACT

Electrical circuit control devices are affixed to the front of an electronic image display screen, within the image displaying area, to provide instantly changeable labels and other graphics which convey information pertaining to operation of the controls. The control devices may be of any of a variety of types that are variously operated by depressing switch buttons, turning a knob, flexing or tilting a joystick or exerting force against an immovable knob. The control devices have compact and durable constructions which enable the devices to be wholly at the front of the display screen as opposed to extending through openings in a screen. Operator manipulation of the control devices is variously sensed by radio frequency sensors, Hall effect sensors, strain gauge sensors, touch sensitive circuits or electromechanical contacts. A remote control unit controls any of variety of different electronic devices and displays different switch button labels and other graphics during controlling of different ones of the devices. A pivotable earpiece enables the same remote control unit to function as a cellular telephone and a cordless telephone.

7 Claims, 22 Drawing Sheets

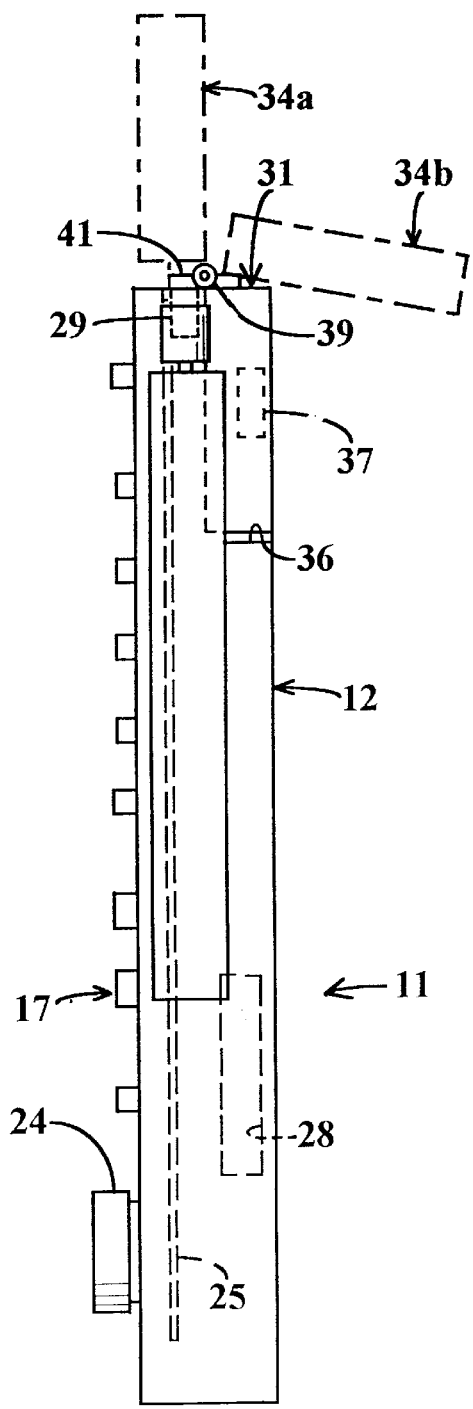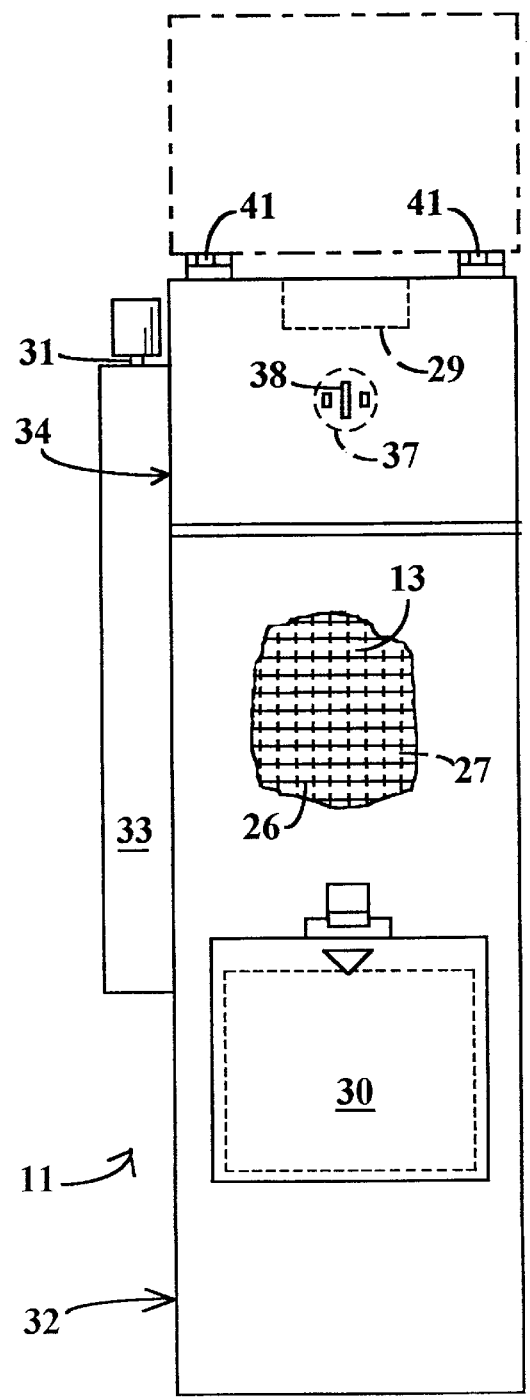
FIG. 5
FIG. 6

FIG. 24
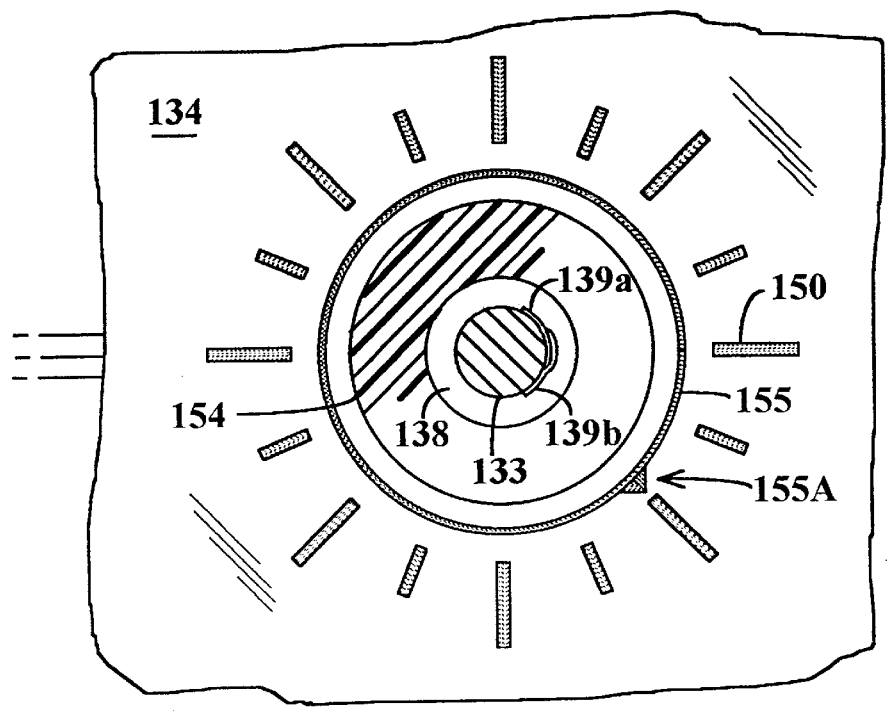
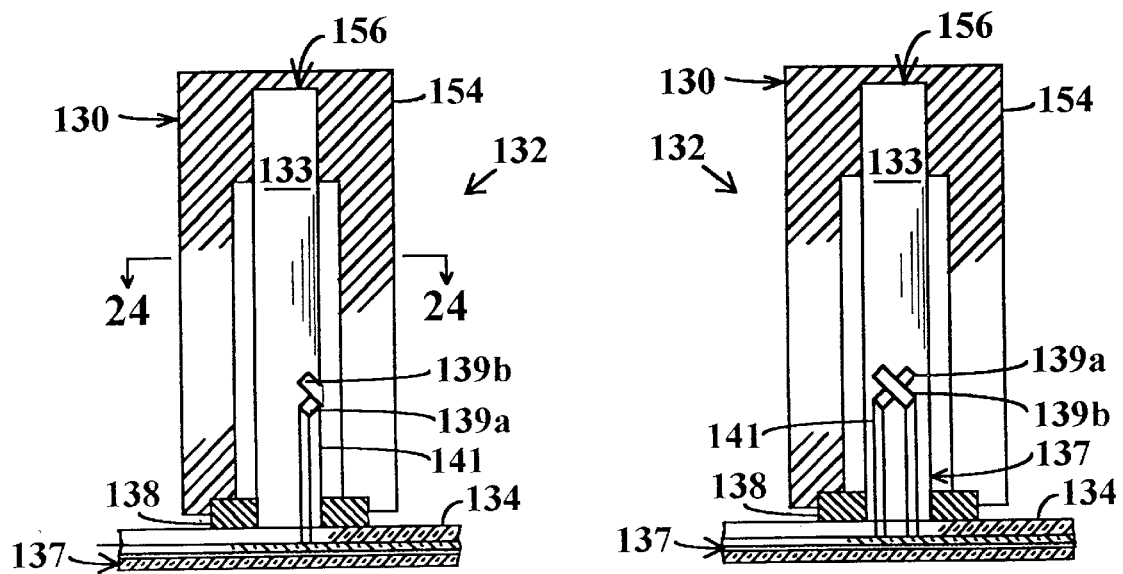
FIG. 22     FIG. 23

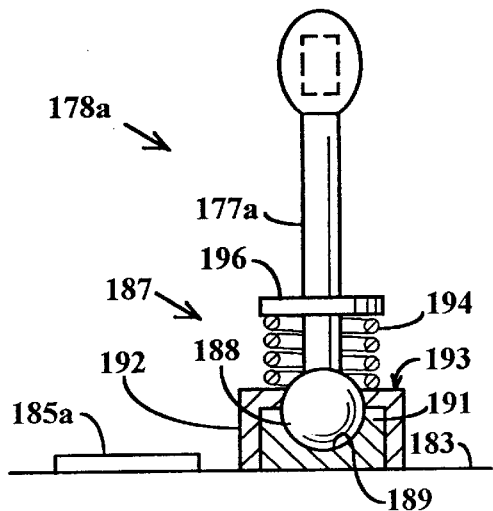
FIG. 30
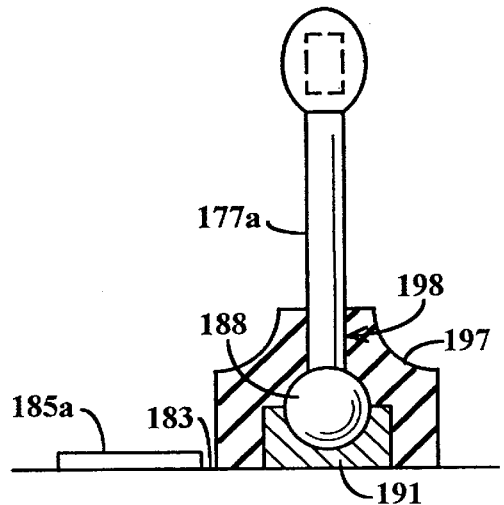
FIG. 31
FIG. 29
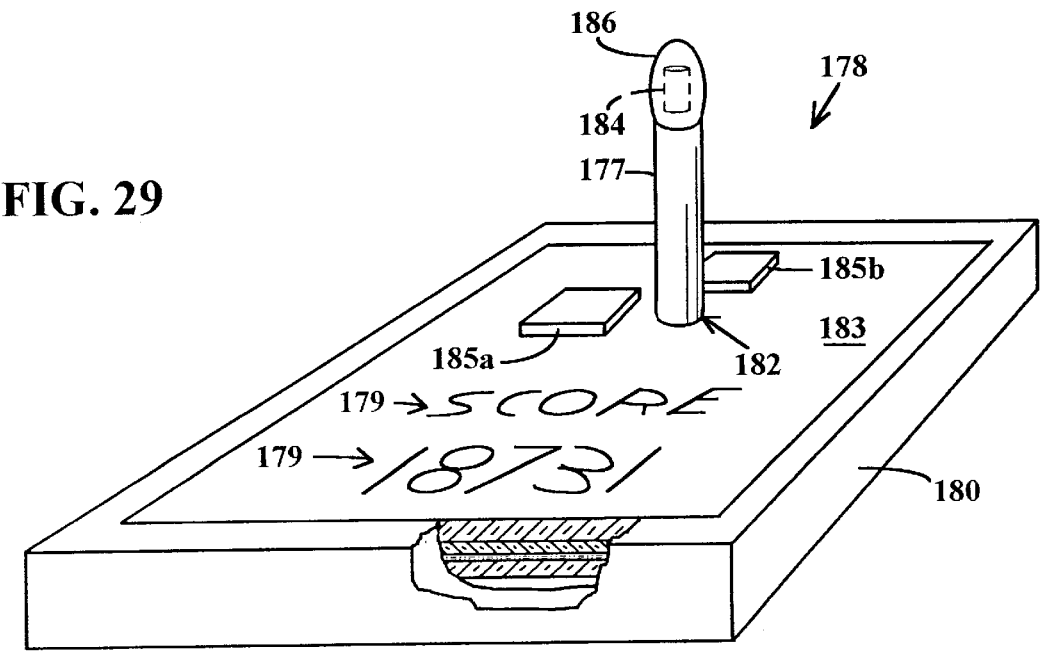

MULTIPLE PURPOSE CONTROLS FOR ELECTRICAL SYSTEMS

CROSS REFERENCE TO RELATED APPLICATIONS

This application is a continuation-in-part of U.S. application Ser. No: 08/644,888 filed on May 10, 1996, now abandoned and which is a continuation-in-part of application Ser. No: 08/420,438 filed on Apr. 10, 1995, now U.S. Pat. No. 5,572,239. Application Ser. No: 08/420,438 is a continuation of application Ser. No: 08/225,782 filed Apr. 11, 1994 and which is now abandoned. Application Ser. No: 08/225,782 was a continuation-in-part of application Ser. No: 08/147,545 filed Nov. 5, 1993 and which is now abandoned.

TECHNICAL FIELD

This invention relates to manually operated control devices for controlling electrical apparatus. More particularly, the invention relates to circuit controls which are associated with electronic image display screens that display instantly changeable information that is pertinent to operation of the controls.

BACKGROUND OF THE INVENTION

Many electrical systems require input of a plurality of different operator initiated control signals each of which controls a different aspect of the operation of the system. Traditionally a separate manually operated control device, such as a switch for example, has been provided for each such aspect. This can result in an undesirably complicated, bulky and costly grouping of control devices and can cause operator error.

More recently this problem has been addressed by providing multi-function control devices. A single control device of this kind is used to control a plurality of different operations of the controlled apparatus and/or to control a plurality of different electrical circuits. Switches which respond to keystrokes at a computer keyboard or to key operations at certain handheld calculators are examples of multi-function controls of this kind. Remote controls which control both a television set and a video cassette recorder are another.

Circuit control devices typically require visible graphics such as labels and/or calibration markings that identify the function of the control, the settings of the control or which provide other information pertinent to operation of the control device. Permanently imprinted graphics situated adjacent to an operator manipulated component of a control device, such as a switch button or a rotary or slidable knob, can cause problems if the control has different functions during different modes of operation. Labels or other graphics that are appropriate for one function of the control device may not be applicable to another. Only a limited number of different imprinted graphics can be fitted into the immediate vicinity of the operator manipulated component and plural graphics at that location can be confusing to an operator.

Electronic image display screens have been situated in the vicinity of circuit controls to provide graphics that can change instantly when the function or setting of a control is changed. Most prior control systems of this kind can display graphics only at a limited portion of the area around a switch button or turnable or slidable knob as the display screen is situated at one side or above or below the button or knob. The display screen has a sizable marginal region which extends around the image display area of the screen that contains structural framing, seals and electrical conductors. Consequently, the graphics cannot be displayed at locations immediately adjacent to the button or knob as would be desirable to assure that an operator associates the graphics with the particular controls to which they relate and to enable precise setting of controls.

In a limited number of instances, switch buttons have been situated within the actual image display area of an electronic image display screen thereby enabling changeable graphics to be displayed in close proximity to the switch buttons. This has heretofore required complication of the internal construction of the screen itself as the switch buttons extend through holes in the screen or are built into the screen itself. Prior controls of this kind have been limited to use of display screens of the segmented electrode type. A screen of that type can present only a very limited range of different graphics.

Locating of circuit controls at the actual image display area of an electronic image display screen has heretofore been confined to the above described construction in which small switch buttons extend within the screen. The advantages of changeable graphics at any desired location around the perimeter of an operator manipulated control member have not been available with other forms of circuit controls.

With regard to a particular type of circuit control device, remote controls which enable control of electrical apparatus from a spaced apart location were originally limited to controlling of a single type of apparatus such as a television receiver for example. Additional remote controls were needed to control other types of electrical apparatus such as a video cassette recorder. More recent remote controls are adapted to control both a television receiver and a video cassette recorder in two different modes of operation of the single remote control. Multiple purpose remote controls of this kind have heretofore required substantially more switch buttons than a single purpose remote control and are bulkier and more confusing to operate. The prior multiple purpose remote controls are limited to control of a small number of different types of apparatus and useful only for remote control operations.

The present invention is directed to overcoming one or more of the problems discussed above.

SUMMARY OF THE INVENTION

In one aspect the present invention provides a remote control unit for enabling control of a plurality of different types of electrical apparatus from a location that is spaced apart from the controlled apparatus. The remote control has a housing which carries a plurality of switches each having a switch button which is manually operated to change an electrical condition in the controlled apparatus, the switch buttons being situated at a control panel surface of the housing. The remote control unit also has a control signal transmitter carried by the housing which transmits coded electromagnetic energy signals to the controlled apparatus in response to operation of the switches. The control panel surface is formed at least in part by an electronic image display screen which displays changeable images that convey information pertinent to operation of the switches. At least a portion of the switch buttons are situated at an image display area of the image display screen thereby enabling display of instantly changeable graphics at locations which are close to the switch buttons.

In another aspect of the invention, apparatus for producing electrical circuit control signals has an electrical switch and an electronic image display screen with a front surface at which graphics pertinent to operation of the switch are displayed. The switch is situated in front of the image display screen within an image display area thereof and has a base which is situated at the front of the screen and which is affixed thereto.

In another aspect of the invention apparatus for producing electrical circuit control signals has a control member which is manipulated by an operator to vary the control signals. Changeable graphics pertinent to operation of the apparatus are displayed at the front surface of an electronic image display screen. The control member is disposed directly in front of an image display area of the screen and has a first end which is attached thereto and a second end which extends outward from the screen for manipulation by an operator. At least one strain gauge load cell is secured to the control member at a location which is outward from the electronic image display screen and an electrical resistance is connected in series relationship with the load cell at an output signal circuit junction. The strain gauge load cell and electrical resistance jointly form a voltage divider and a voltage source is connected across the voltage divider.

In another aspect of the invention apparatus for producing electrical circuit control signals has an elongated joystick with first and second opposite ends, the first end being movable by an operator in any of a plurality of different directions. Changeable graphics pertinent to operation of the apparatus are displayed at the screen of an electronic image display. The second end of the joystick is disposed in front of the screen at an image display area thereof and is attached to the image display.

In still another aspect of the invention a control panel for electrical apparatus has a touch sensitive area at a front face of the panel which may be touched at any of a plurality of different locations therein to initiate selected ones of a plurality of different control signals. Optical energy emitters at edge regions of the touch sensitive area direct a first series of parallel optical energy beam across the area in a first direction and also in a second direction which is at right angles with the first direction. Optical energy detectors at edge regions of the area detect the locations at which an operator touches the panel by detecting interruptions of the optical energy beams. The control panel is an electronic image display screen. An electrical circuit control device having a knob which is slid along a track to enable operator variation of an electrical control signal is disposed at the front face of the control panel. The electrical circuit control device protrudes from the face of the control panel and extends through the first and second series of optical energy beams. At least the portion of the electrical control device which intersects with the optical energy beams is transparent to optical energy.

One aspect of the invention greatly facilitates controlling of a plurality of different electronic devices, such as television receivers, video cassette recorders and radios for example, with a single remote control unit. In a preferred form, the same unit may also be used for additional purposes which do not involve remote control such as use as a cellular telephone for example. These results are accomplished by situating at least a portion of the manually operated switches of the remote control within the image display area of an electronic image display screen. Use of an image display screen as a control panel of the remote control enables instant and automatic changing of the labels and other graphics that identify switch functions and current settings of controls when the unit is switched from one mode of operation to another. In the preferred form the remote control has a microphone at one end and a hinged earpiece, containing an acoustical speaker, enabling the remote control unit to function as a portable cellular telephone and as a cordless telephone.

Another aspect of the invention provides compact switch constructions which are particularly suitable for affixing to the screen of an electronic image display without necessarily requiring that passages extend through the screen such as are found in traditional control panels.

In another aspect of the invention operator manipulated control members which are secured to the face of an electronic image display screen and which are not movable relative thereto are caused to duplicate the functions of controls having a turnable knob or a slidable knob. This is accomplished by using strain gauges to sense torsion forces or linearly directed forces that are applied to the control members.

In another aspect of the invention apparatus for producing electrical circuit control signals includes an elongated joystick which is situated in front of the screen of an electronic image display which displays changeable images pertinent to operation of the apparatus. A control signal producing circuit responds to lateral movement of one end of the joystick.

In still another aspect the invention provides a manually operated circuit control device which includes a control of the kind having a knob that is slid along a track to vary a control signal. The track is secured to the face of an electronic image display screen which provides changeable graphics during different modes of operation of the control device. The operator may initiate additional control signals by touching different locations on the display screen. Infrared beams sense the locations at which the operator touches the screen. Portions of the control that intersect the infrared beams are formed of infrared transparent material.

The invention, together with further aspects and advantages thereof, may be further understood by reference to the following description of the preferred embodiments and by reference to the accompanying drawings.

BRIEF DESCRIPTION OF THE DRAWINGS

FIG. 5 is a side view of the remote control of the preceding figures.

FIG. 6 is a broken out view of the back of the remote control of the preceding figures.

FIG. 22 is an axial section view of a circuit control device with changeable graphics which selectively varies a control signal in response to torsion forces exerted on a control member by an operator.

FIG. 23 is another axial section view of the circuit control device of FIG. 22 taken at right angles to the plane of FIG. 22.

FIG. 24 is a section view taken along line 24—24 of FIG. 22.

FIG. 29 is a broken out perspective view of a joystick type of electrical circuit control which can display instantly changeable graphics.

FIG. 30 is an axial section view of a first modification of the joystick circuit control of FIG. 29.

FIG. 31 is an axial section view of a second modification of the joystick circuit control of FIG. 29.

DETAILED DESCRIPTION OF THE PREFERRED EMBODIMENTS

Figure 1:
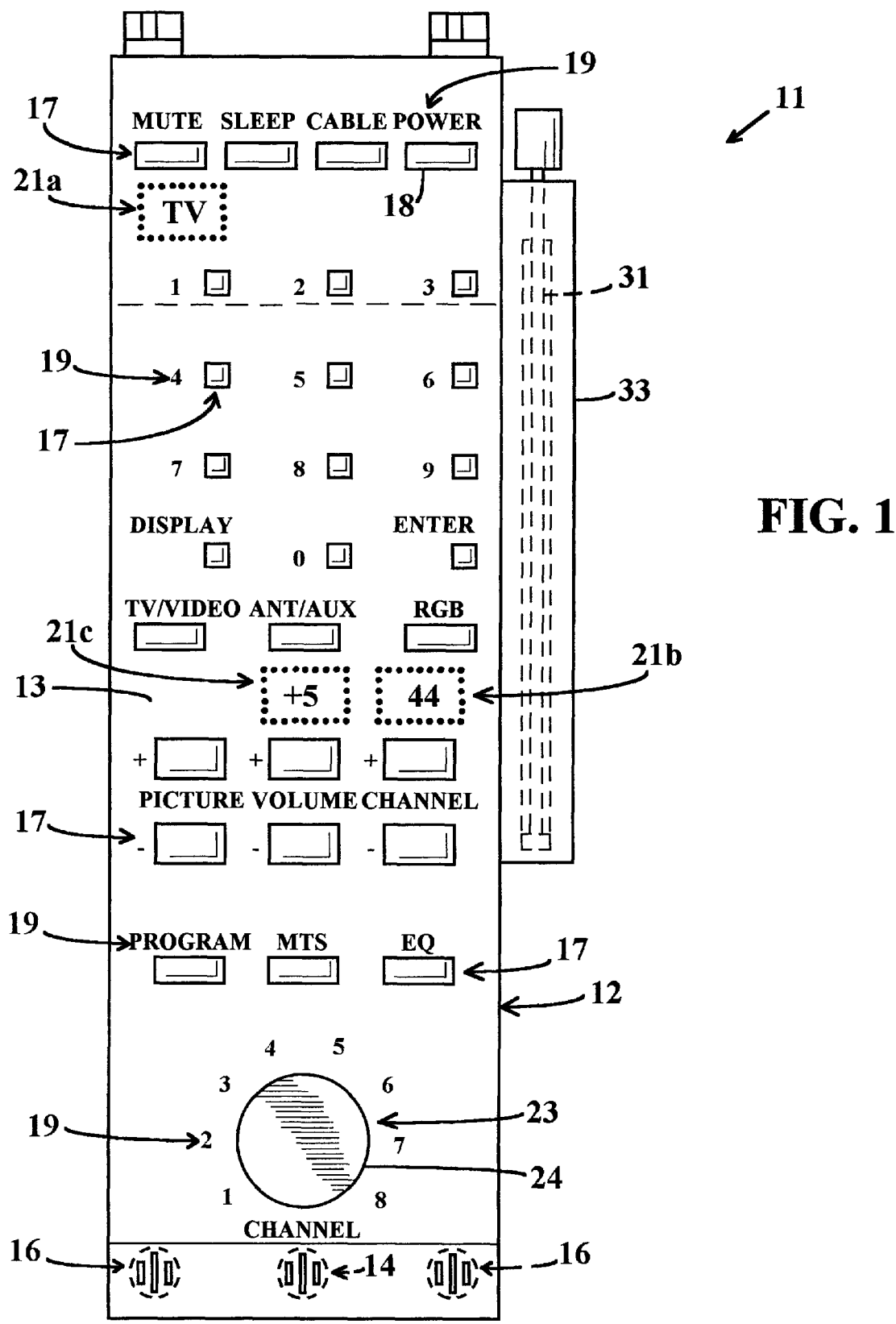
FIG. 1 is a front view of a remote control for controlling a plurality of electronic devices, the remote control being shown displaying graphics appropriate for controlling a television receiver from a location that is away from the television receiver.

Referring initially to FIG. 1 of the drawings, the multiple purpose remote control unit 11 of this example has a housing 12 or casing with a front wall that is formed by an electronic image display screen 13 of the flat panel type except at the bottom region of the front wall where a microphone 14 and a pair of acoustical speakers 16 are located. A plurality of small switches 17, having switch buttons 18, are secured to the face of the screen 13 at spaced apart locations and enable operator initiation of control signals for any of a plurality of different electrical systems. The image display screen 13 displays labels 19 that identify the functions of the buttons or which convey other information pertaining to operation of the remote control 11. The labels 19 change instantly and automatically when the remote control 11 is switched from control of one type of electrical device to control of a different type of device.

Figure 2:
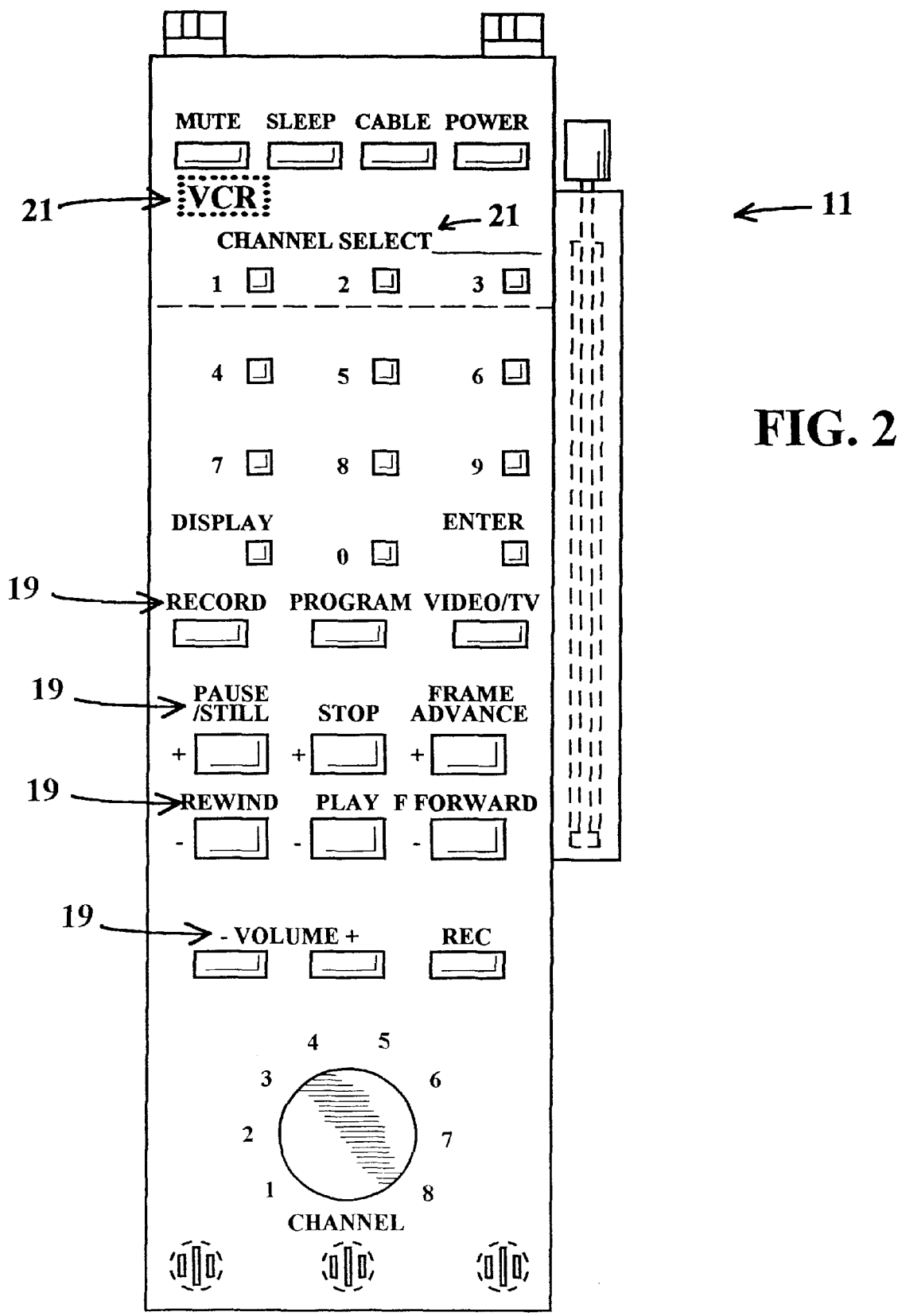
FIG. 2 is another front view of the remote control of FIG. 1 showing changed graphics which are displayed during a video cassette recorder control mode of operation of the device.
Figure 3:
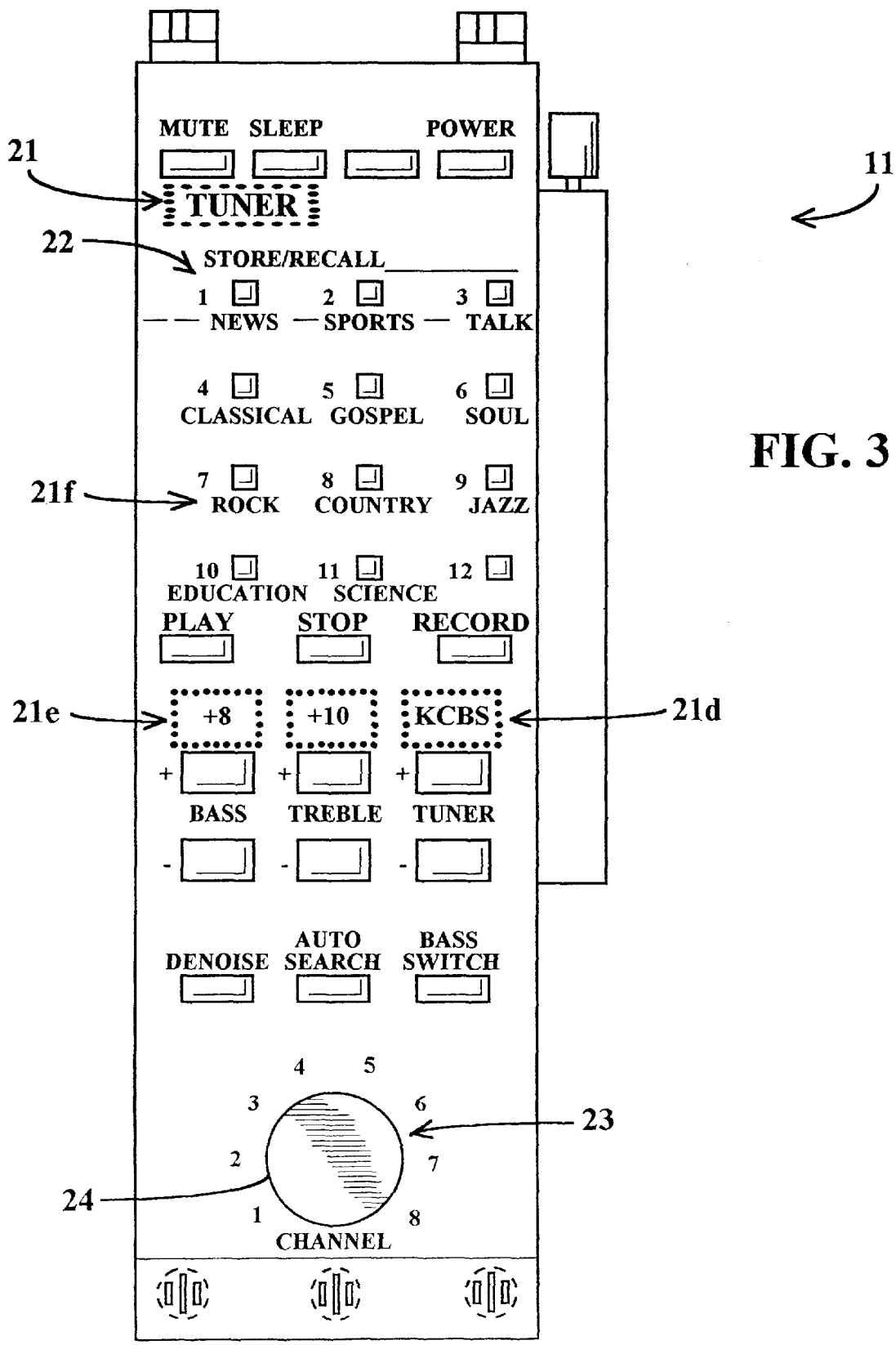
FIG. 3 is a front view of the remote control of FIG. 1 showing graphics which are displayed when the device is used to control a radio.
Figure 4:
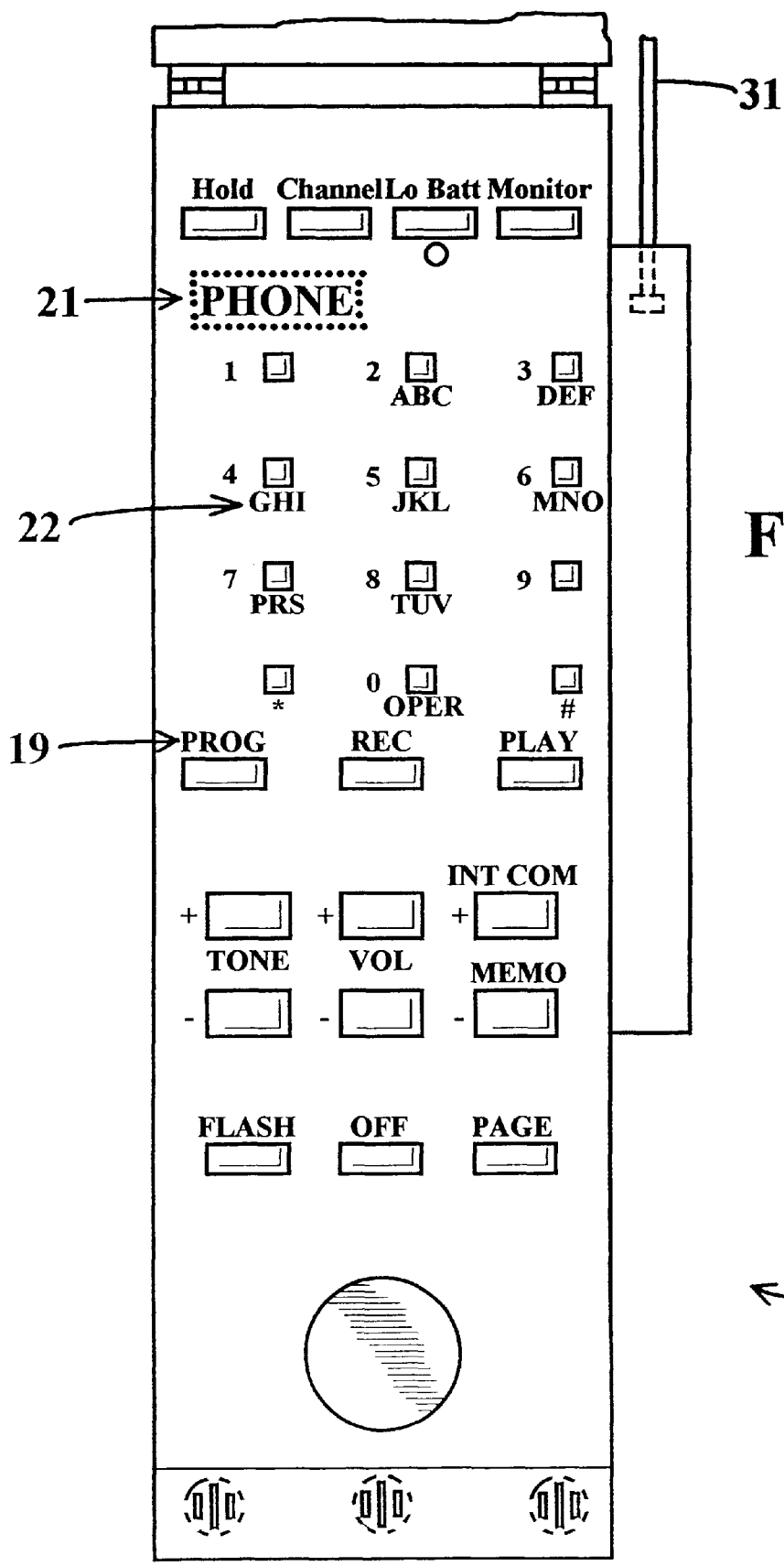
FIG. 4 is a front view of the remote control of FIG. 1 showing changed graphics which appear during use of the device as a cellular telephone or as a cordless telephone.

The remote control 11 can be adapted to control diverse different types of electrical devices. For purposes of example, FIG. 1 depicts switch labels 19 and other graphics 21 that this remote control 11 displays while it is being used to control a television receiver. FIG. 2 depicts changed labels 19 and graphics 21 that are displayed when the same remote control 11 is controlling a video cassette recorder. FIG. 3 shows still other labels 19 and graphics 21 that are displayed by the same remote control 11 during controlling of a radio. FIG. 4 shows labels 19 and graphics 21 which are presented when the remote control 11 is operating as a cellular telephone or a cordless telephone.

The basic switch labels 19 which are temporarily displayed during any one of these modes of operation may be similar to the permanently imprinted labels which are found on conventional single purpose remote controls or on cellular telephones or cordless telephones. The image display 13 enables display of additional graphics 21 that are not found on the conventional remote controls and telephones. Referring again to FIG. 1, the additional graphics may for example include an identification 21a of the current mode of operation of the remote control 11. In the television mode the current TV channel selection 21b and current volume setting 21c may be displayed. In the radio mode of operation, as shown in FIG. 3, additional graphics 21d may identify the call letters of the radio station to which the controlled radio is currently tuned. Further graphics 21e may identify the current settings of the bass and treble controls of the controlled radio.

Twelve of the switches 17 are arranged in a rectangular array 22 similar to the array of push-buttons that are used to enter telephone numbers at conventional telephone dials. Switches of the array 22 are used to dial telephone numbers during the telephone modes of operation as shown in FIG. 4. In the radio control mode of operation, shown in FIG. 3, the same array 22 of switches may be used to select specific radio stations. In this embodiment, additional temporary graphics 21f are displayed adjacent to each such switch 17 of the switch array 22 that identify the type of programs that are broadcast by the radio station which each switch selects. Any other desired graphics, including decorative graphics and moving graphics, can be displayed during one or more modes of operation by appropriately conditioning a flat panel display controller which will hereinafter be described.

In addition to switches 17, the remote control 11 can include one or more other forms of circuit control to enable operator selection of control signals. In this example a rotary encoder 23 is secured to the face of the image display screen 13 below the switches 17. The rotary encoder may be of the known form which produces coded binary signals that identify the current angular setting of a rotatable knob 24.

Referring jointly to FIGS. 5 and 6, the image display screen 13 may be a flat panel display of any of the known types such as a liquid crystal display, STN, TN, passive or active matrix, FED, plasma or EL for example. The display screen 13 is preferably of one of the types in which image pixels are energized by applying a voltage across particular ones of an array of parallel row busbars 26 and particular ones of an array of parallel column busbars 27 which extend in orthogonal relationship with the row busbars. Display screens of this type can produce any desired image at any desired location within the image display area of the screen.

Components of the electrical circuit of the remote control 11 which will hereinafter be described are secured to a circuit board 26 which is situated within housing 12 behind the display screen 13. A latchable door 27 at the back of housing 12 provides for access to an internal battery compartment 28. An infrared control signal transmitter 29 is situated at the front end 31 of housing 12 in position to directed coded infrared signals outward towards devices which are being controlled. Suitable internal constructions for infrared transmitters 29 of this kind are known to the art. An antenna 31, disposed in parallel relationship with a side wall 32 of housing 12, is used during the cellular and cordless telephone modes of operation of the remote control 11. The antenna 31 extends into the front end of an elongated antenna compartment 33 at the side wall 32 and can be retracted into the compartment when not in use.

A pivoting earpiece 34 for use during the telephone modes of operation has an active position shown by dashed outline 34a in FIG. 5 at which it extends outward from the front end 31 of housing 12 in alignment with the housing. During remote control modes of operation, the earpiece 34 is pivoted out of the path of the infrared light that is emitted by infrared transmitter 29 and seats in a conforming recess 36 in the back of the front end of housing 12. The earpiece contains a third acoustical speaker 37 which is situated behind sound transmitting slots 38 in the wall of the earpiece that faces in the same direction as the flat panel display 13 when the earpiece is at the active position.

Figure 7:
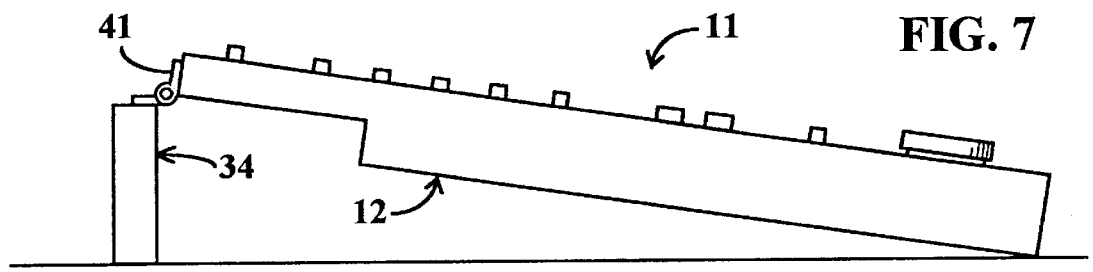
FIG. 7 is another side view of the remote control shown configured for resting on a table, desk or other support surface.

The earpiece 34 preferably has a third position, shown by dashed outline 34b in FIG. 5, which is intermediate between the active and inactive positions and at which it is angled relative to the housing 12. As shown in FIG. 7, this enables the remote control 11 to be rested on a table, desk or other surface in an orientation at which it is tilted towards the operator which orientation facilitates viewing of the display screen and manipulation of the push-buttons 17.

Figure 9:
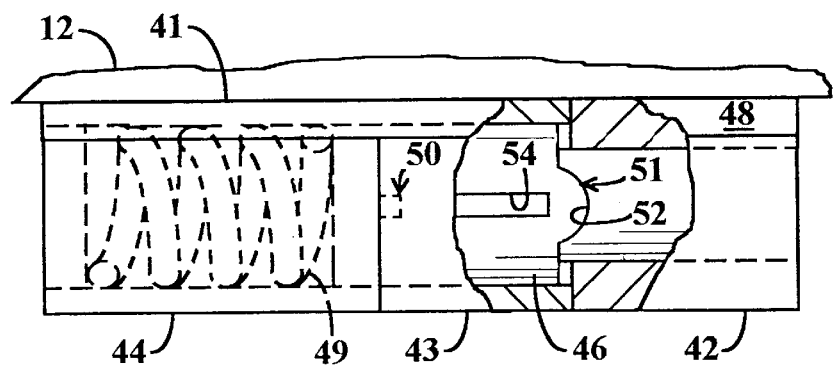
FIG. 9 is a broken out top view of the hinge of FIG. 8.
Figure 8:
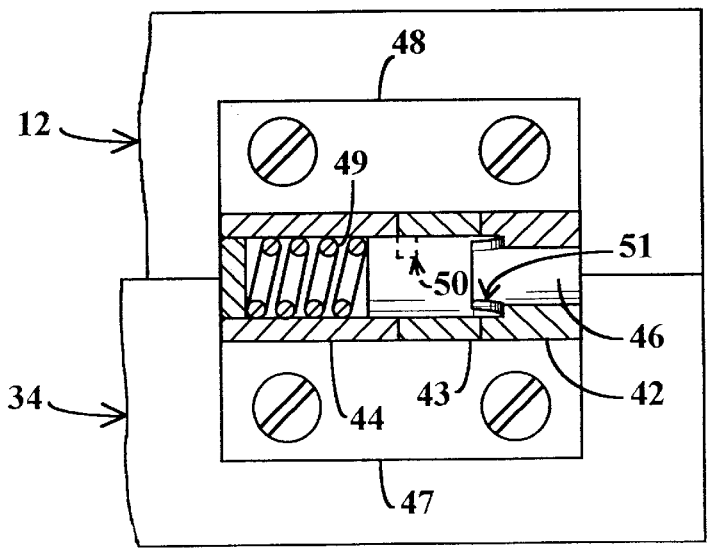
FIG. 8 is an axial section view of a three position detented hinge which couples a pivoting earpiece to the body of the remote control of the preceding figures.

Referring again to FIGS. 5 and 6, detenting means 39 act to resist pivoting of the earpiece out of the inactive position 34, the active position 34a and the third position 34b. In the present example, the earpiece is coupled to housing 12 by a pair of hinges 41 situated at opposite sides of the infrared transmitter 29 and which provide the detenting action. Referring to FIGS. 8 and 9, each hinge may for example have three aligned tubular members 42, 43 and 44 and a hinge pin 46 which extends within the three members. Tubular members 42 and 44 are joined to a first hinge plate 47 which is secured to earpiece 34 and the middle tubular member 43 is joined to the other hinge plate 48 which is secured to housing 12. Hinge pin 46 is movable in an axial direction within the tubular members 42, 43 and 44 and a compression spring 49 urges the pin towards member 42. The portion of pin 46 which extends into tubular member 42 is of lesser diameter than the other portion of the pin. At two opposite locations on pin 46 the transition between the larger and smaller diameter portions of the pin is formed by tongues 51 which have an arcuate profile and which seat in conforming notches 52 formed in the interior passage of tubular member 42. Spring 49 resists withdrawal of the tongues 51 from notches 52 and thereby resists pivoting of the earpiece 34 out of the inactive position at which it is seated against the back of housing 12. Such pivoting can be effected by exerting a force on the earpiece which is sufficient to overcome the force of spring 49.

A projection 50 on the inner surface of the middle tubular member 43 extends into a slot 54 which extends along the side of pin 46. This prevents rotation of the pin 46 relative to the middle tubular member 43. As the earpiece 34 including the other tubular members 42 and 44 is pivoted 180° to orient the earpiece in the active position, tongues 51 re-seat in notches 52 to provide a similar detenting action at that position. Additional notches 52 within tubular member 42, which are not visible in the drawings, provide for a similar detenting action at the hereinbefore described third position of earpiece 34.

Figure 10:
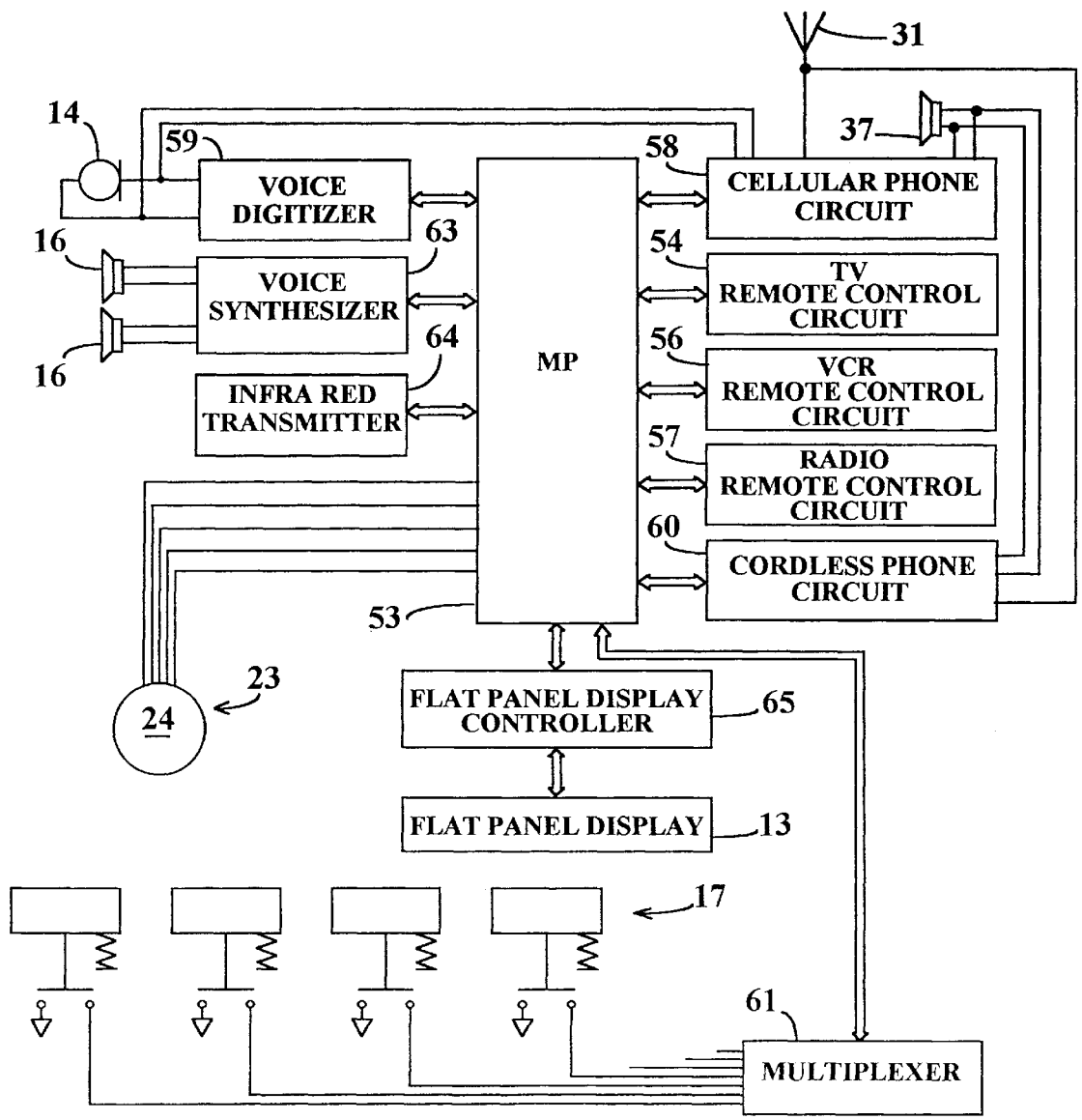
FIG. 10 is a schematic circuit diagram showing electrical components of the remote control of the preceding figures.

With reference to FIG. 10, internal operations of the remote control unit 11 are controlled by a digital data processor which is a microprocessor 53 in this example. In response to operator initiated mode selection signals the microprocessor 53 variously activates a television receiver remote control circuit 54, a video cassette recorder remote control circuit 56, a radio remote control circuit 57, a cellular phone circuit 58 or a cordless phone circuit 60 each of which may be of one of the known circuit configurations as heretofore used in single purpose remote controls or cellular or cordless telephones. Alternately, the functions of one or more of the circuits 54, 56, 57, 58 and 60 can be programmed into the microprocessor 53 itself.

Figure 10A:
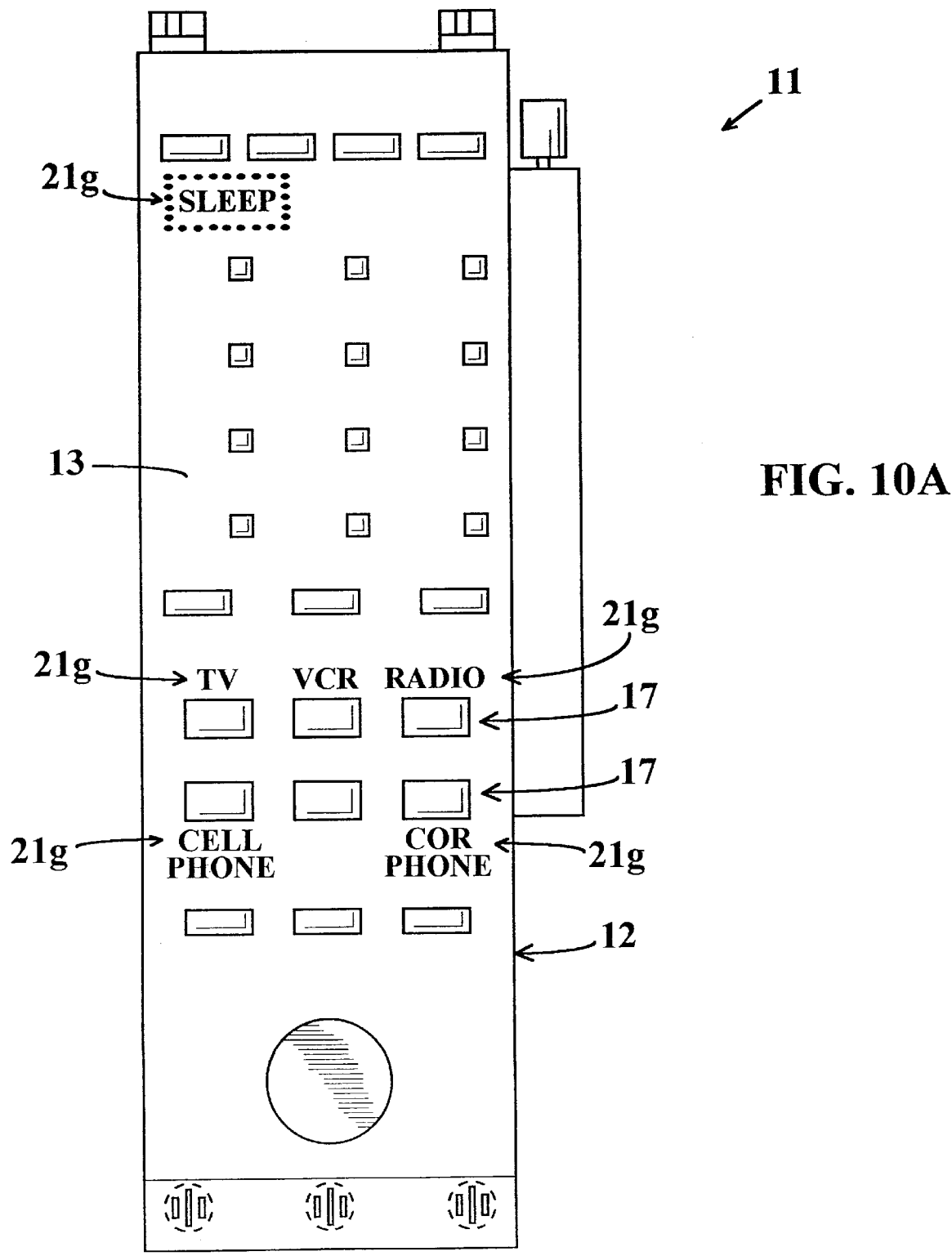
FIG. 10A is a front view of the remote control showing graphics which may be displayed during a sleep mode of operation during which the device is not in use.

In this example of the invention operator selection of a mode of operation is effected by voice commands or, alternately, by operation of selected ones of the previously described switches 17. To enable voice control, the previously described microphone 14 is connected to microprocessor 53 through a voice digitizer 59 that encodes sounds in digital form and which may be of the known circuit configuration. When the remote control 11 is not in use microprocessor 53 is in a sleep mode of operation in which it and microphone 14 and voice digitizer 59 remain energized. During the sleep mode of operation the microprocessor 53 responds to digitally encoded particular words or abbreviations, such as "TV", "VCR" , "Radio", "Cellphone"

and "Corphone", for example, by activating the particular circuit 54, 56, 57, 58 or 60 that provides the requested mode of operation. Alternately, the operator may end the sleep mode by depressing particular ones of the previously described switches 17 each of which initiates a different one of the active modes of operation. FIG. 10A depicts graphics 21g which are displayed at locations adjacent these particular switches 17 during the sleep mode of operation. The operator may end a selected active mode of operation by depressing a particular one of the switches 17 such as the SLEEP switch 17a of FIGS. 1, 2 and 3 or the OFF switch 17b of FIG. 4 or by speaking the voice command "Off". Microprocessor programming for effecting these operations will be hereinafter described.

Referring again to FIG. 10, a multiplexer 61 which is connected to microprocessor 53 through a data bus 62 repetitively samples the condition of each of the push-button switches 17 at a repetition rate sufficiently high to detect momentary closures of the switches. The rotary encoder 23 delivers a multi-bit digital signal to the microprocessor 53 that encodes the current angular setting of the turnable knob 24 of the encoder. The microprocessor 53 responds to closures of the switches 17 and resetting of encoder 23 by signaling the currently active one of the circuits 54, 56, 57, 58 and 60 to effect the functions which the switches and encoder control.

During any of the remote control modes of operation, control signals produced by the currently active one of the circuits 54, 56 or 57 are converted to optical form and directed towards the controlled television receiver, video cassette recorder or radio by the infrared transmitter 29 in the known manner. During the telephone modes of operation the output of microphone 14 and voice digitizer 59 is transmitted to the cellular telephone circuit 58 or to the cordless telephone circuit 60. Circuits 58 and 60 transmit and receive voice encoded radio signals through the antenna 31 in the known manner. Analog voice signals produced by circuit 58 or circuit 60 are applied to the acoustical speaker 37 that is within the previously described pivotable earpiece 34 which is shown in FIG. 5.

Referring again to FIG. 10, microprocessor 53 is coupled to the additional acoustical speakers 16 through a digital to analog voice synthesizer 63. This enables optional programming of the microprocessor 53 to perform any of a number of additional useful functions. The microprocessor 53 may, for example, be programmed to record and later play back spoken messages which the operator wishes to record. As another example the microprocessor 53 may be programmed to function as an answering machine for the cellular and cordless phone circuits 58 and 60. The radio remote control circuit 57 may be replaced with or supplemented by a complete radio circuit within the remote control 11 itself.

Figure 11A:
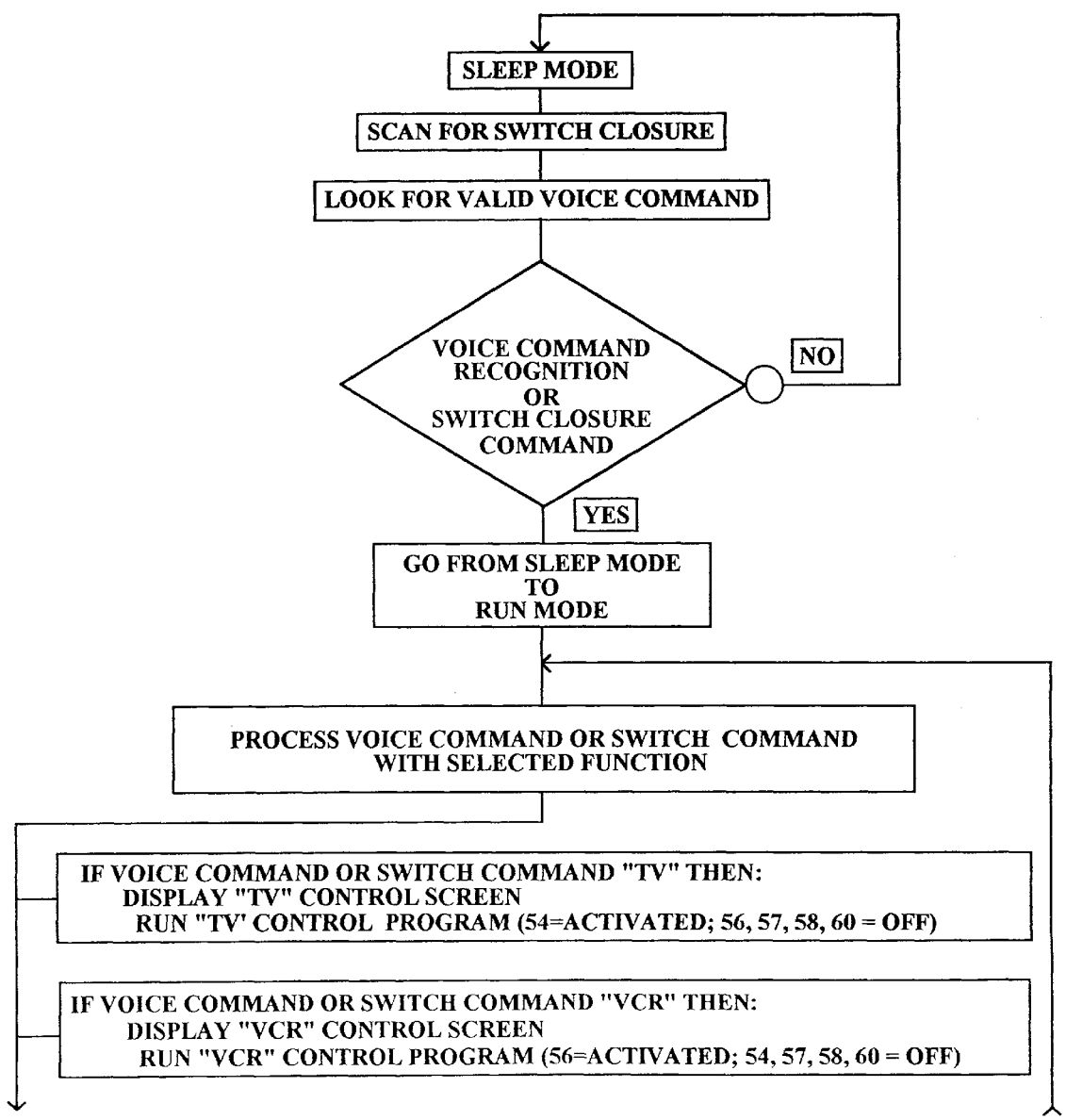
FIGS. 11A, 11B and 11C, which may be juxtaposed with FIG. 11A uppermost and FIG. 11C lowermost, jointly depict suitable programming in flowchart form for a digital data processor which is a component of the circuit of FIG. 10.
Figure 11B:
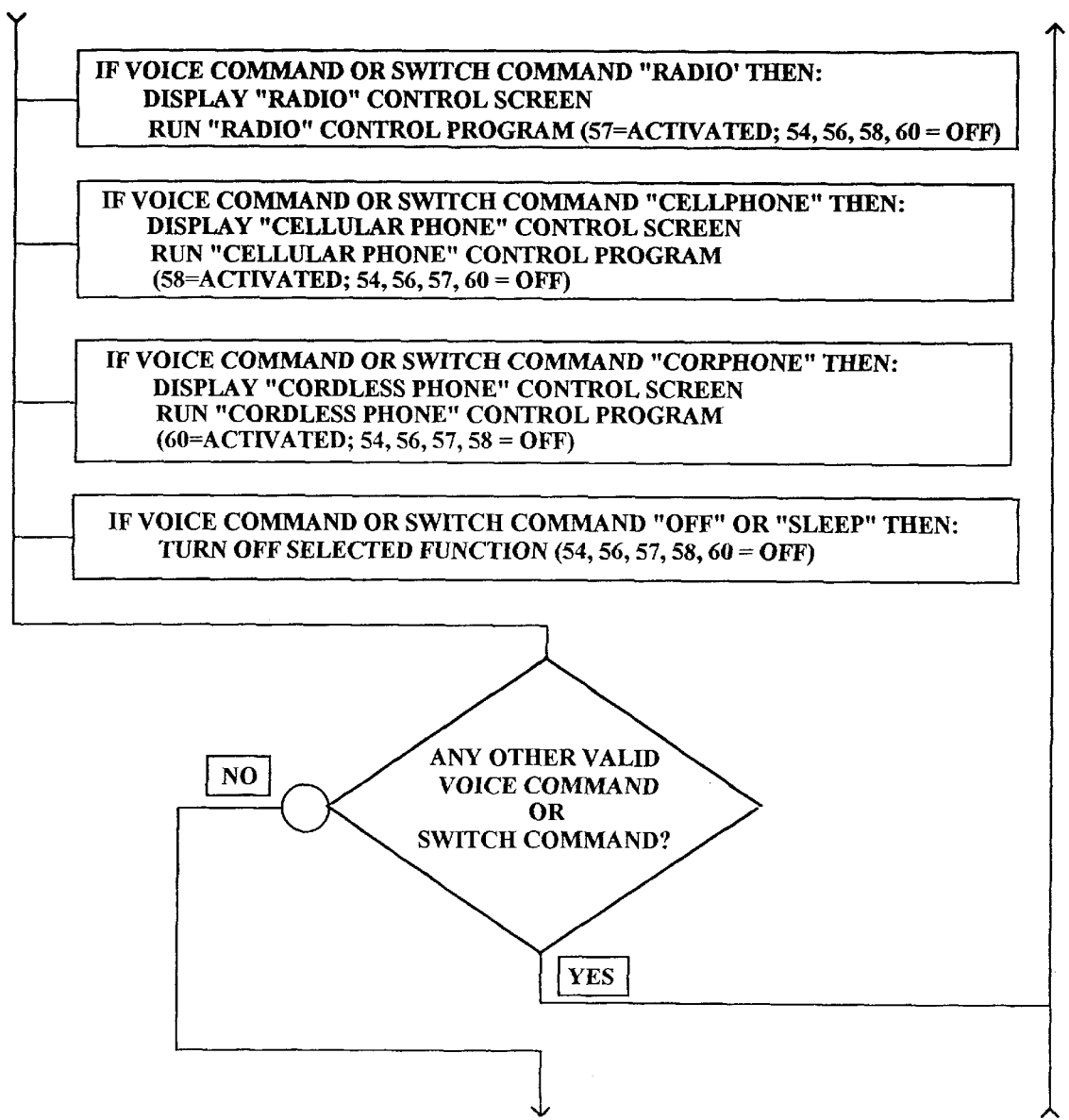
Figure 11C:
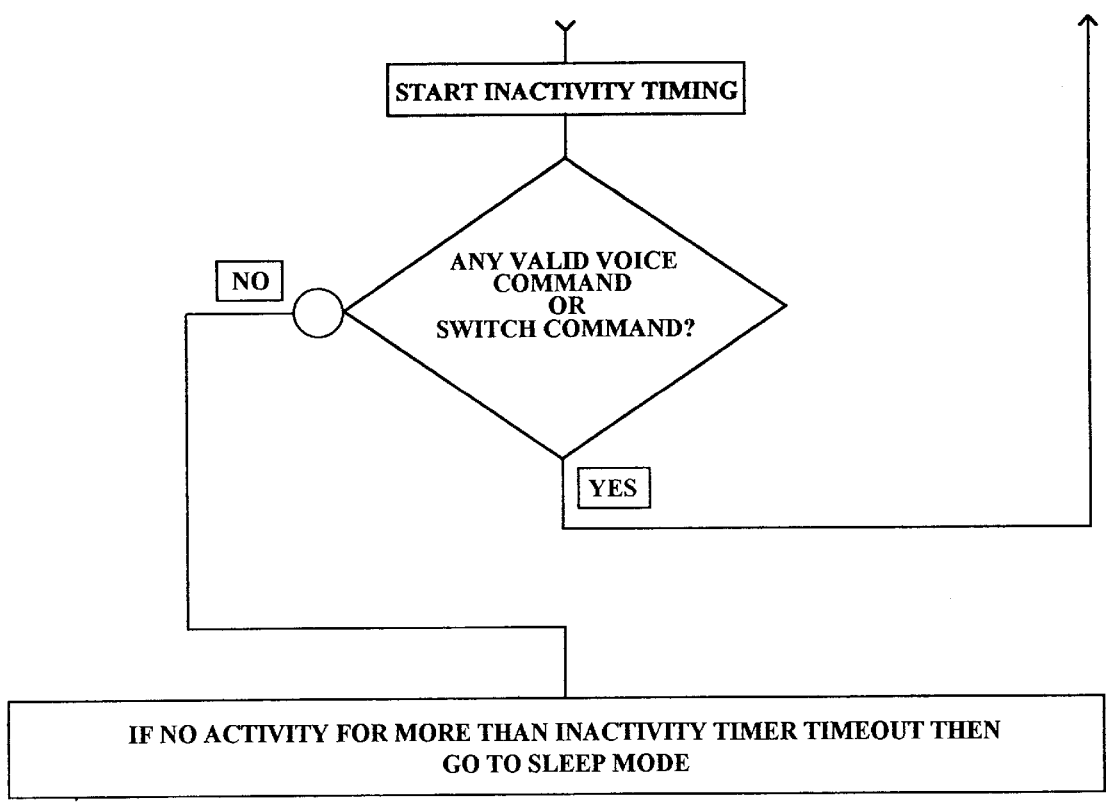
Figure 14:
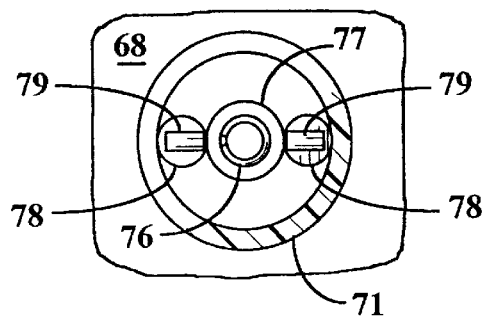
FIG. 14 is a section view taken along line 14—14 of FIG. 12.

Referring jointly to FIGS. 10, 10A and to the program flowchart shown in FIGS. 11A, 11B and 11C, microprocessor 53 remains active during the sleep mode of operation. Acting through multiplexer 61 the microprocessor 53 repetitively monitors each of the push-button switches 17 to detect a momentary closure of any of the switches that are currently functioning as mode selector switches. The microprocessor 53 also monitors the output of voice digitizer 59 to detect any voice command calling for one of the active modes of operation. Upon detection of a mode selection command either from a switch 17 or the voice digitizer 59 the microprocessor 53 enters a run mode of operation during which the command is processed.

In particular, if the voice command is "TV" or the TV mode selector switch has been momentarily closed then the microprocessor 53 activates the TV remote control circuit 54 and initiates display of the TV remote control graphics 19, 21 shown in FIG. 1. If the voice or switch closure command is "VCR" then the microprocessor 53 activates the VCR remote control circuit 56 and initiates display of the VCR remote control graphics shown in FIG. 2. In response to the voice or switch closure command "Radio" the microprocessor 53 activates radio remote control circuit 57 and signals the flat panel display controller 65 to initiate display of the radio control mode graphics shown in FIG. 3. The microprocessor 53 responds to a voice or switch closure command "Cellphone" by activating cellular phone circuit 58 and responds to a "Corphone" command by activating cordless phone circuit 60. In either of the telephone modes of operation the microprocessor initiates display of the telephone graphics shown in FIG. 4.

Referring again to FIGS. 10, 10A, 11A, 11B and 11C, the control device 11 continues to function in the selected mode of operation until microprocessor 53 receives an "Off" or "Sleep" command either from voice digitizer 59, the "Sleep" switch button of FIGS. 1, 2 and 3 or the "Off switch button of FIG. 4 or until the operator enters a command for different mode of operation.

If the operator has entered an "Off" or "Sleep" command the microprocessor 53 inactivates the particular circuit 54, 56, 57, 58 or 60 that is active at the time that the command is entered. The microprocessor 53 then waits for a brief period of time and then reverts to the sleep mode of operation if no new mode selection command is entered during that period of time. If a new mode selection command is entered during that period of time the program loops back and repeats the previously described operations which result in activation of the selected one of the circuits 54, 56, 57, 58 or 60 and display of the graphics 15 appropriate for the selected circuit. The microprocessor 53 also repeats these previously described operations any time that the operator enters a new mode selection other than the "Off" or "Sleep" command.

The particular control device 11 which has been herein described for purposes of example operates in any of a television control mode, a VCR control mode, a radio control mode, a cellular telephone mode and a cordless telephone mode. Other embodiments of the control device need not have this same combination of operating modes and can easily be adapted to have still other modes of operation for controlling other electrical systems.

As described in U.S. Pat. No. 5,572,239, it is possible to provide passages through a flat panel display so that the base of a control switch or the like can be behind the screen while the push-button or other actuator extends through the screen. This requires that the screen have a specialized internal construction in order to avoid disruption of the row and column busbars that control the image pixels. Referring again to FIG. 5, this complication can be avoided by situating the entire switch 17 at the front of the display screen 13. It is then preferable that the switches 17 have a compact and durable construction. Examples of switch constructions which are particularly suited for attachment to the face of an electronic display screen, within the image area, are shown in FIGS. 12 to 20.

Figure 12:
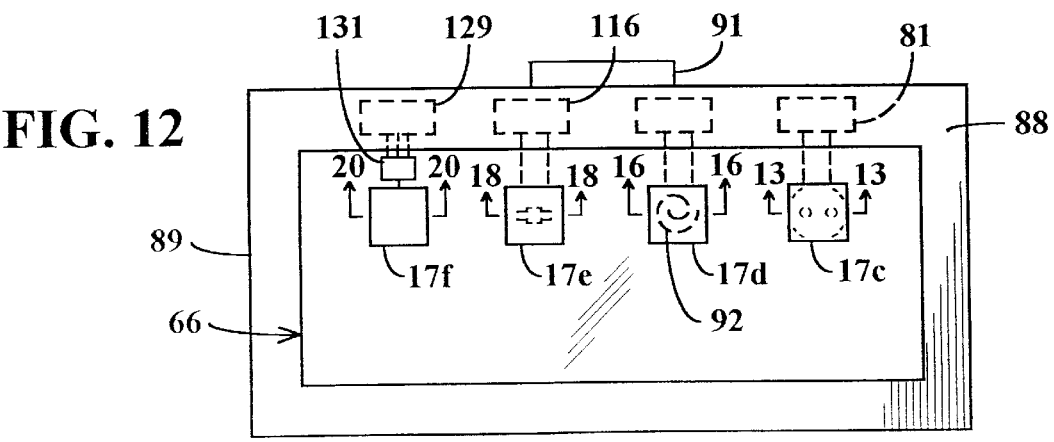
FIG. 12 is a front view of a bank of manually operated control switches secured to the screen of a flat panel display in order to provide changeable graphics adjacent to the switches, each of the switches having a different construction.

Referring to FIG. 12, the switches 17c, 17d, 17e and 17f which are described herein are not limited to use with the previously described remote control device. The switches 17c, 17d, 17e and 17f, fastened to the face of an electronic display screen 66, may be used to control diverse different types of electrical apparatus when it is advantageous to display changeable labels or other graphics in close proximity to the switches. For purposes of illustration, FIG. 12 shows four different types of switch 17c, 17d, 17e and 17f disposed at the face of the same display screen 66. In practice any of the switches 17c, 17d, 17e and 17f may be used singly or a bank of switches which share the same display screen 66 may be of a single type.

Figure 13:
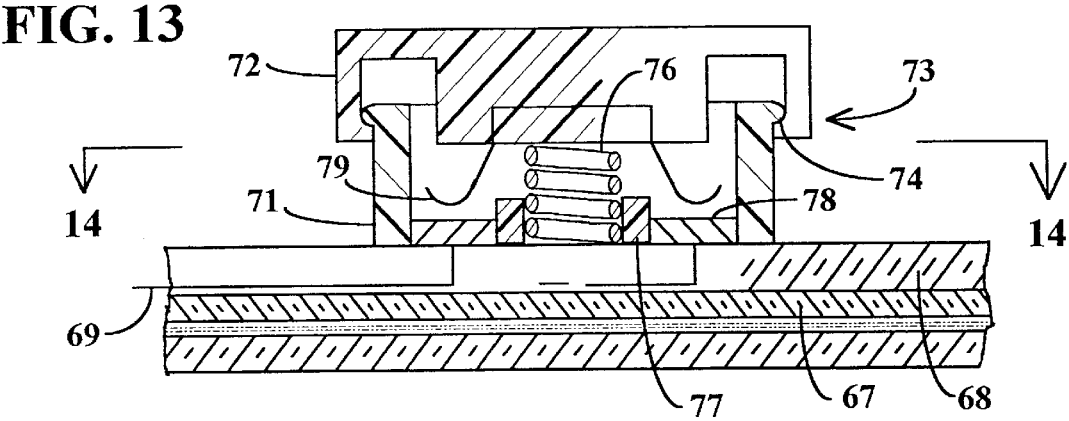
FIG. 13 is a section view taken along line 13—13 of FIG. 12 and showing a first switch construction.

Referring jointly to FIGS. 12 and 13, switches 17c, 17d, 17e and 17f may be affixed directly to the transparent cover plate 67 component of the electronic display screen 13 but is preferably affixed to a second supplementary transparent cover plate 68 which overlays the primary cover plate 67. The conductors 69 which connect with the switches may then extend to the edge region of the display screen 66 along the underside of the supplementary cover plate 68 in manner which protects them from abrasion and short circuiting.

A first switch 17c is of the electromechanical type and has an annular base 71 affixed to the supplementary cover plate 68 by adhesive or other means and has a switch cap 72 that is fitted onto base 71 and which can be depressed by an operator's finger to operate the switch. An annular lip 73 at the back of the switch cap 72 extends under a small flange 74 of base 71 to retain the switch cap on the base. The base 71 and switch cap 72 are formed of resilient material to enable snap engagement of the cap onto the base. Within base 71, one end of a compression spring 76 is seated in an annular retainer 77 that is adhered to the supplementary cover plate 68. The other end of the spring 76 bears against the switch cap 72 and exerts a force against the cap that is directed outward from the display cover plate 68.

Figure 15:
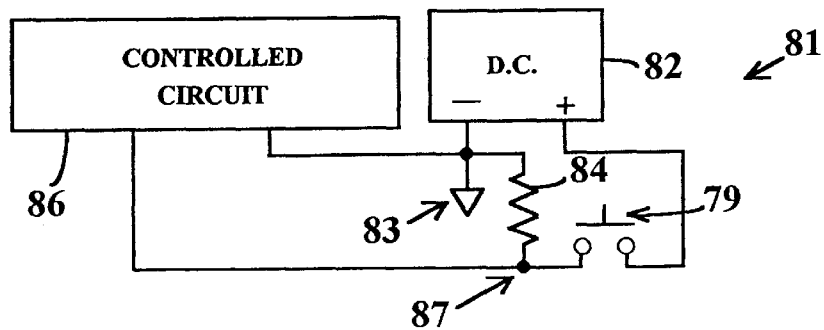
FIG. 15 is a schematic circuit diagram showing interconnection of the switch of FIGS. 13 and 14 with a circuit which is controlled by the switch.

A pair of switch contacts 78 is bonded to cover plate 68 within base 71, the contacts being at opposite sides of spring retainer 77. A flexible conductor 79 is partially embedded in the body of the switch cap 72 and has opposite ends which protrude from the cap and which are positioned to make contact with the contacts 78 when the cap is depressed by an operator. Referring to FIG. 15, in one form of control signal producing circuit 81 the contacts 78 are connected between one terminal of a direct current power supply 82 and a circuit chassis ground 83 in series with a resistor 84. The other terminal of the power supply is connected directly to ground 83. The circuit 86 which the switch 17c controls is connected across ground 83 and a circuit junction 87 which is between contacts 78 and resistor 84. Thus closure of the switch 17c applies a control signal voltage to the controlled circuit 86.

Referring again to FIGS. 12 and 13, components of the control signal producing circuit 81 of this example are situated in the marginal region 88 of the flat panel display 89 that is outside of the image area defined by the screen 66. A multi-pin connector 91 at an edge of the screen 66 provides for connection of the switch circuit 81 with the apparatus that the switch controls Alternately, components of the circuit 81 can be at the back of the 35 screen 66 or can be at a remote location.

The conductors 69 which extend from the switch contacts 78 to the marginal region 88 of the flat panel display 89 can be formed of transparent conductive material, such as indium tin oxide, in order to avoid obscuring of images which are displayed by the screen 66. Alternately, the conductors 69 may be very thin traces of opaque metal that extend in parallel relationship with the rows or columns of image pixels and which are situated midway between two adjacent rows or two adjacent columns of pixels.

Figure 16:
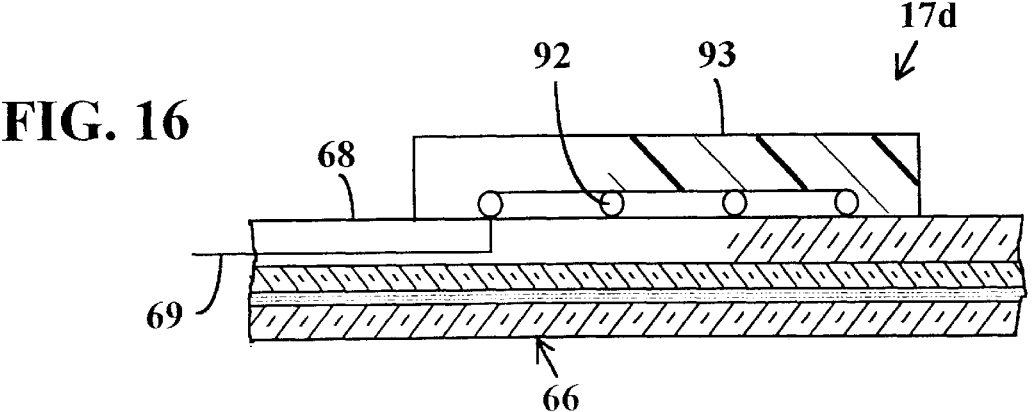
FIG. 16 is a section view taken along line 16—16 of FIG. 12 and showing a second switch construction.

With reference to FIGS. 12 and 16, another switch 17d uses radio frequency electronics to sense the presence of an operator's finger in the vicinity of the switch. The switch 17d includes an electrical inductance coil 92 affixed to the supplementary cover plate 68 of the display 66 and in the preferred form the coil is a spiral shaped trace of conductive material bonded to the cover plate. It is preferable that the coil 92 be protected by a thin overlay 93 of plastic or other non-conductive material.

Figure 17:
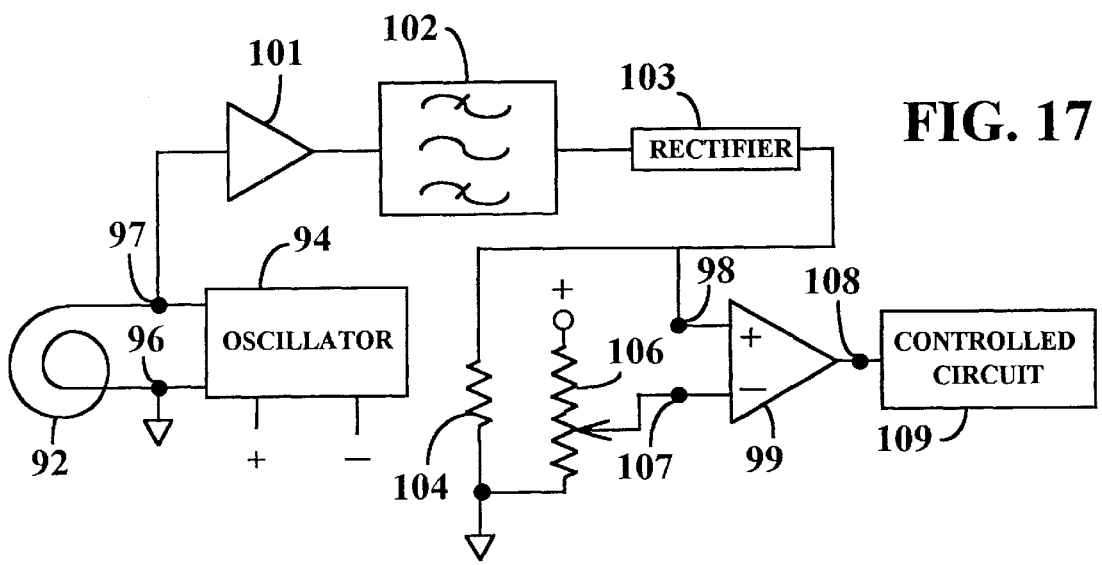
FIG. 17 is a schematic circuit diagram showing electronic components which are part of the switch of FIG. 16.

Referring to FIG. 17, the coil 92 is the inductive component of the resonant circuit of a radio frequency oscillator 94. One output terminal 96 of oscillator 94 is connected to a chassis ground and the other output terminal 97 is coupled to one input 98 of a comparator amplifier 99 through a buffer amplifier 101, a band pass filter 102 and a rectifier 103. A voltage dropping resistor 104 is connected between the one amplifier input 98 and ground. A potentiometer 106 applies a reference voltage to the other input 107 of comparator amplifier 99. Band pass filter 102 transmits the frequency at which oscillator 94 resonates when there is no operator's finger in the vicinity of coil 92 and suppresses other frequencies. Thus in the absence of the operator's finger rectifier 103 applies a voltage to comparator amplifier input 98. Potentiometer 106 applies a lower reference voltage to the other comparator input 107. Thus in the absence of the operator's finger the output 108 of the comparator amplifier 99 is in a high electrical state. The presence of an operator's finger in proximity to coil 92 alters the resonant frequency of oscillator 94. Filter 102 stops transmitting the frequency and the voltage at comparator input 98 drops below the reference voltage at comparator input 107. This causes comparator output 108 to change to a low electrical condition. The comparator amplifier output 108 provides the desired control signal for the controlled circuit 109. Output 108 reverts to the high condition when the operator's finger is removed from the vicinity of coil 92.

Figure 18:
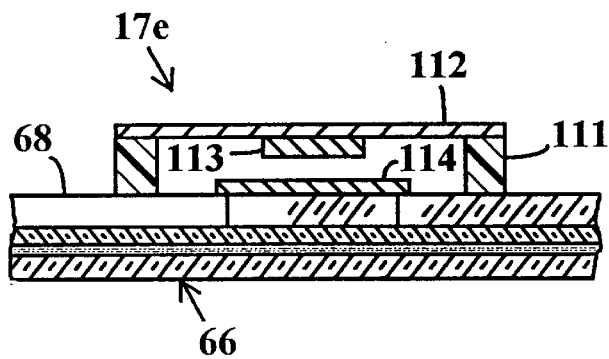
FIG. 18 is a section view taken along line 18—18 of FIG. 12 and showing a third switch construction.

Referring jointly to FIGS. 12 and 18, another switch 17e uses the Hall effect to produce control signals. Switch 17e has an open frame shaped base 111 bonded to the supplementary transparent cover plate 68 of the display screen 66. The base 111 is spanned by a flexible membrane 112. A small magnet 113 is bonded to the surface of membrane 112 that faces the cover plate 68. A Hall effect sensor 114 of the known form is affixed to the cover plate 68 within base 111. Magnet 113 is spaced apart from sensor 114 when membrane 112 is in an unflexed condition. Depression of the membrane 112 by an operator's finger moves the magnet 113 closer to sensor 114 and thereby causes a decrease of the electrical resistance of the sensor.

Figure 19:
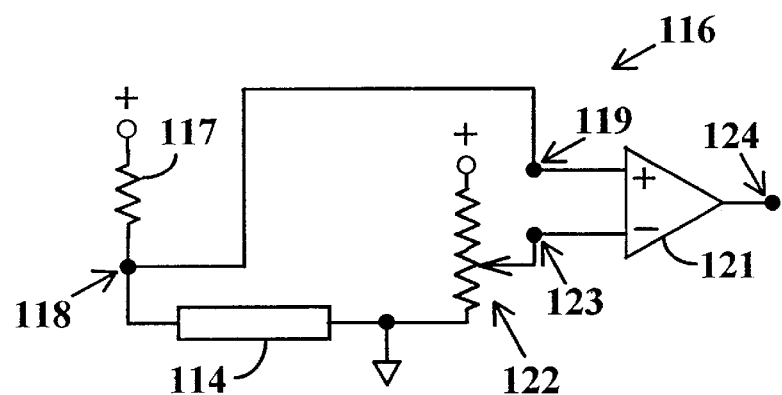
FIG. 19 is a schematic circuit diagram showing electronic components which are part of the switch of FIG. 18.

Referring to both FIG. 18 and FIG. 19, the signal producing circuit 116 of the switch 17e includes a resistor 117 connected in series with the Hall effect sensor 114 and forming a voltage divider therewith. DC voltage is applied to the output terminal of the sensor 114 through resistor 117 and the other terminal of the sensor is connected to a chassis ground. A circuit junction 118 between resistor 117 and sensor 114 is connected to one input 119 of a comparator amplifier 121 and a potentiometer 122 applies a reference voltage to the other comparator amplifier input 123.

Potentiometer 122 is set to apply a reference voltage to comparator input 123 that is lower than the voltage at the other comparator input 119 when membrane 112 is in an undepressed condition. The decrease of the electrical resistance of the Hall effect sensor 114 which occurs when an operator depresses membrane 112 causes the voltage at comparator input 119 to drop below the reference voltage at comparator input 123. This switches the comparator output terminal 124, which is the control signal output, from a high condition to a low condition which persists until the operator's finger is removed from membrane 112.

Figure 20:
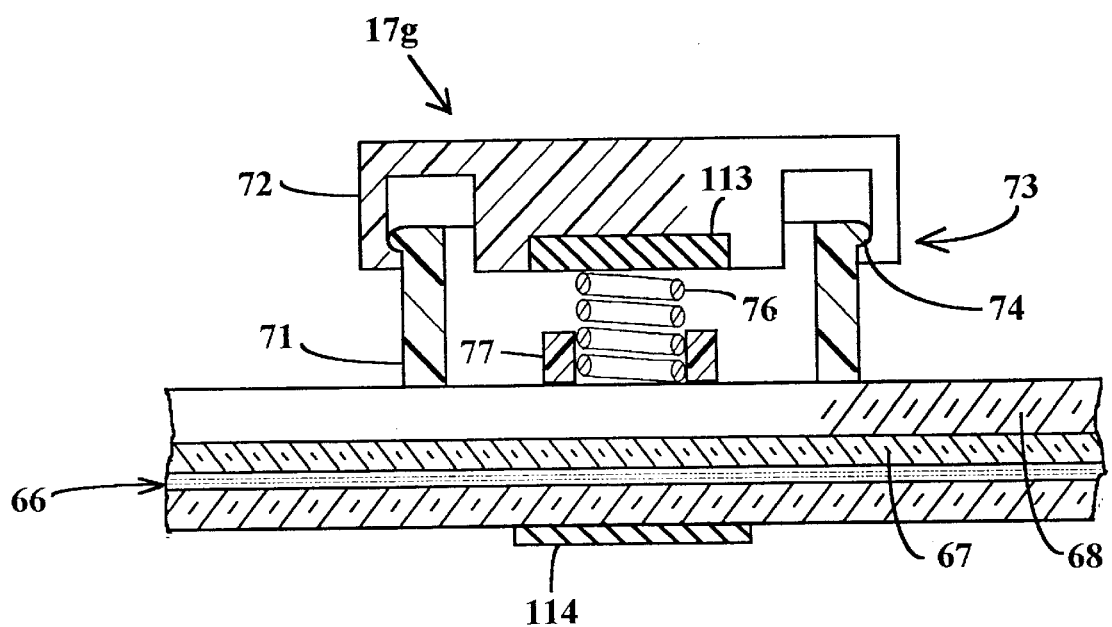
FIG. 20 is a section view illustrating a modification of the switch of FIGS. 18 and 19.

Referring to FIG. 20, the Hall effect sensor 114 can be located at the back of the flat panel display 66 behind the other components of the switch 17g. This modification of the switch 17g has an annular base 71 bonded to the cover glass 68 of the flat panel display 66 and has a switch cap 72 snap fitted thereon which components may be similar to the corresponding components of the previously described embodiment of FIGS. 13 and 14. As in that previously described embodiment the switch 17g of FIG. 20 contains a compression spring 76 having one end seated in an annular spring retainer 77 that is bonded to cover glass 68 and having an opposite end which bears against switch cap 72 to urge the cap outward from cover glass 68. The magnet 113 in this instance is embedded in the switch cap 72. Except as herein described the switch 17g may be similar to the switch 17e which has been previously described with reference to FIGS. 13 and 14.

Figure 21:
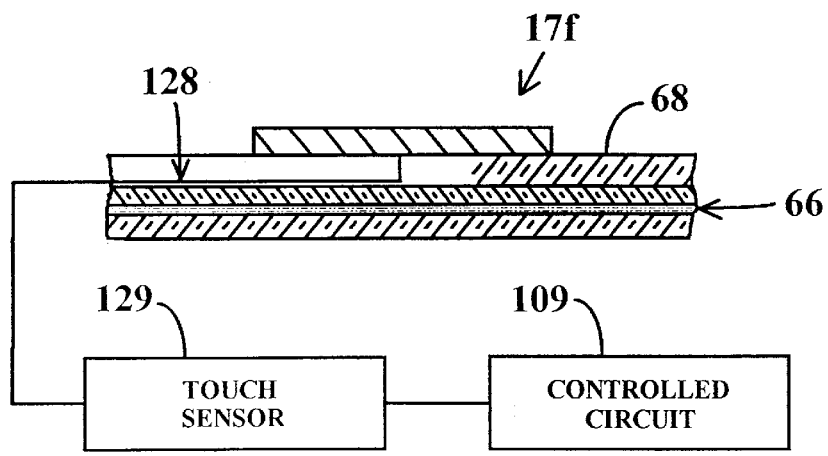
FIG. 21 is in part a section view taken along line 21—21 of FIG. 12 showing a fourth switch construction and in part a schematic circuit diagram showing an electronic component of the switch.

Referring jointly to FIGS. 12 and 21, another switch 17f which is affixed to the face of the flat panel display screen 66 is a touch sensitive switch having an electrically conductive plate 127 that is bonded to the screen 66 within the image displaying area of the screen. A conductive trace 128 patterned on cover plate 68 connects the plate with a touch sensor 129 which may be a touch responsive switching circuit of any of the known circuit configurations. The switching circuit 129 is preferably embodied in a small integrated circuit chip 131 which is bonded to cover plate 68 in close proximity to the conductive plate 127. Control signals produced by the switching circuit are transmitted to the apparatus which is being controlled through the previously described electrical connector 81.

Changeable graphics in the immediate vicinity of an electrical circuit control device is equally advantageous when the control device is a potentiometer, variable resistor, rotary encoder or the like at which the operator turns a knob to vary the control signal. For example, the previously described remote control 11 shown in FIG. 1 includes a rotary encoder 23. Referring now to FIGS. 22, 23 and 24, control signals similar to those which are produced by rotary controls can be generated by a control device 132 having a knob 130 that does not turn to any perceptible extent.

The control device 132 of this example has a shaft 133 of metal, plastic or the like which protrudes outward from the transparent cover plate 134 of a flat panel display 136 at a location within the image display area. The base 137 of shaft 133 is bonded to cover plate 134 with a strong adhesive. The base 137 is preferably seated in an annular socket 138 which is bonded to both the cover plate 134 and the shaft 133 to strengthen the connection of the shaft to the flat panel display 136.

At least one and preferably two strain gauge load cells 139a and 139b are bonded to the side of shaft 133. In this example of the invention, the two load cells 139a and 139b are in an intersecting relationship with one end of each cell being further from the base 137 of the shaft than the other end of the cell. Thus the minute deformation of the shaft 133 which occurs when an operator attempts to twist the shaft tends to stretch one of the cells 139a, 139b and tends to compress the other cell. This varies the electrical resistances of the two cells 139a and 139b in an opposite manner. Conductors 141 extend along shaft 133 and along the undersurface of cover plate 134 to connect the cells 139a and 139b with a control signal processing circuit 142 which is shown in FIG. 25 and which can be situated within the marginal region of the flat panel display 136, on the back of the display or elsewhere.

The load cells 139a and 139b need not necessarily be in the intersecting relationship shown in FIGS. 22 to 24 and additional load cells can be provided at, for example, a location on shaft 133 that is opposite from the location of load cells 139a and 139b.

Figure 25:
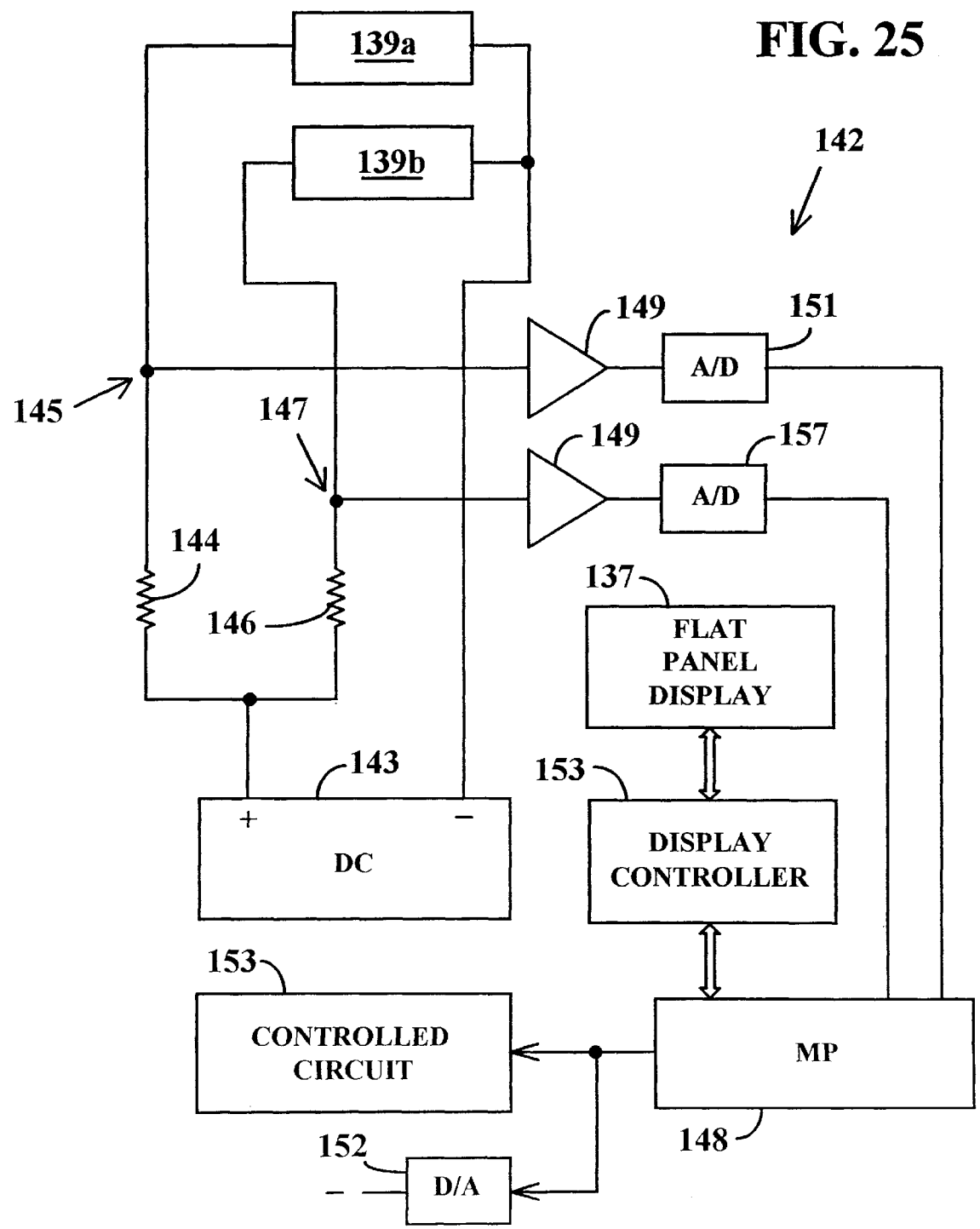
FIG. 25 is a schematic circuit diagram showing electronic components which are part of the control device of FIGS. 22 to 24.

Referring to FIG. 25, load cell 139a is connected across the positive and negative terminals of a DC voltage source 143 in series relationship with a first resistor 144. The other load cell 139b is connected across the DC voltage source 143 in series relationship with a second resistor 146. Load cell 139a is the particular cell that experiences a stretching force when a clockwise torsion force is applied to the supporting shaft 133 and the other load cell 139b is the particular load cell that experiences a compressive force when the clockwise torsion force is applied to the shaft. A counter clockwise torsion force on the shaft 133 tends to compress load cell 139a and to stretch the other load cell 139b. Thus the electrical resistance of load cell 139a increases in response to the clockwise torsion force and decreases in response to the counter clockwise torsion force. The other load cell 139b exhibits an opposite change of electrical resistance in response to either of the torsion forces.

The first load cell 139a and first resistor 144 jointly form a first voltage divider in which the voltage at a circuit junction 145 between the load cell and the resistor changes when the resistance of the load cell changes. The other load cell 139b and second resistor 146 form a second voltage divider having a similar circuit junction 147 at which the voltage changes when the resistance of the other load cell 139b changes. The voltages at the two circuit junctions 145 and 147 change in opposite directions in response to a torsion force on the supporting shaft 133.

Each circuit junction 145 and 147 is coupled to a separate port of a digital data processor, which is a microprocessor 148 in this example, through a separate one of a pair of buffer amplifiers 149 and a separate one of a pair of analog to digital signal converters 151. Referring jointly to FIGS. 22 and 25, the voltage changes which occur at circuit junctions 145 and 147 enable microprocessor 148 to detect application of a torsion force to shaft 133 and to determine the angular direction of the force. A voltage drop at circuit junction 145 is indicative of an increase in the resistance value of load cell 139A caused by a clockwise torsion force on shaft 133. The microprocessor 148 responds to an increase in that resistance value by outputting a control signal having a value that continues to rise as long as the increase in the resistance value persists. When the resistance value of load cell 139a returns to its original level, indicating that the operator is no longer applying torsion force to shaft 133, the microprocessor 148 continues to output the control signal value that existed when the operator ceased to apply force to the shaft. A voltage drop at circuit junction 147 indicates an increase in the resistance value of load cell 139b caused by a counterclockwise torsion force on the shaft 133. The microprocessor 148 progressively lowers the magnitude of the outputted control signal as long as an increase in the resistance value of load cell 139b persists. The microprocessor then maintains the control signal at the value which exists at the time that the resistance of load cell 139b returns to its original value or until another resistance increase occurs at either load cell 139a or load cell 139b. The rate at which the microprocessor 148 raises or lowers the outputted control signal value is preferably a function of the amount of torsion force that the operator is applying to shaft 133. For this purpose, microprocessor 148 monitors the rate of change of a resistance increase at either of the load cells 139a and 139b as it is indicative of the current magnitude of the torsion force.

Figure 26:
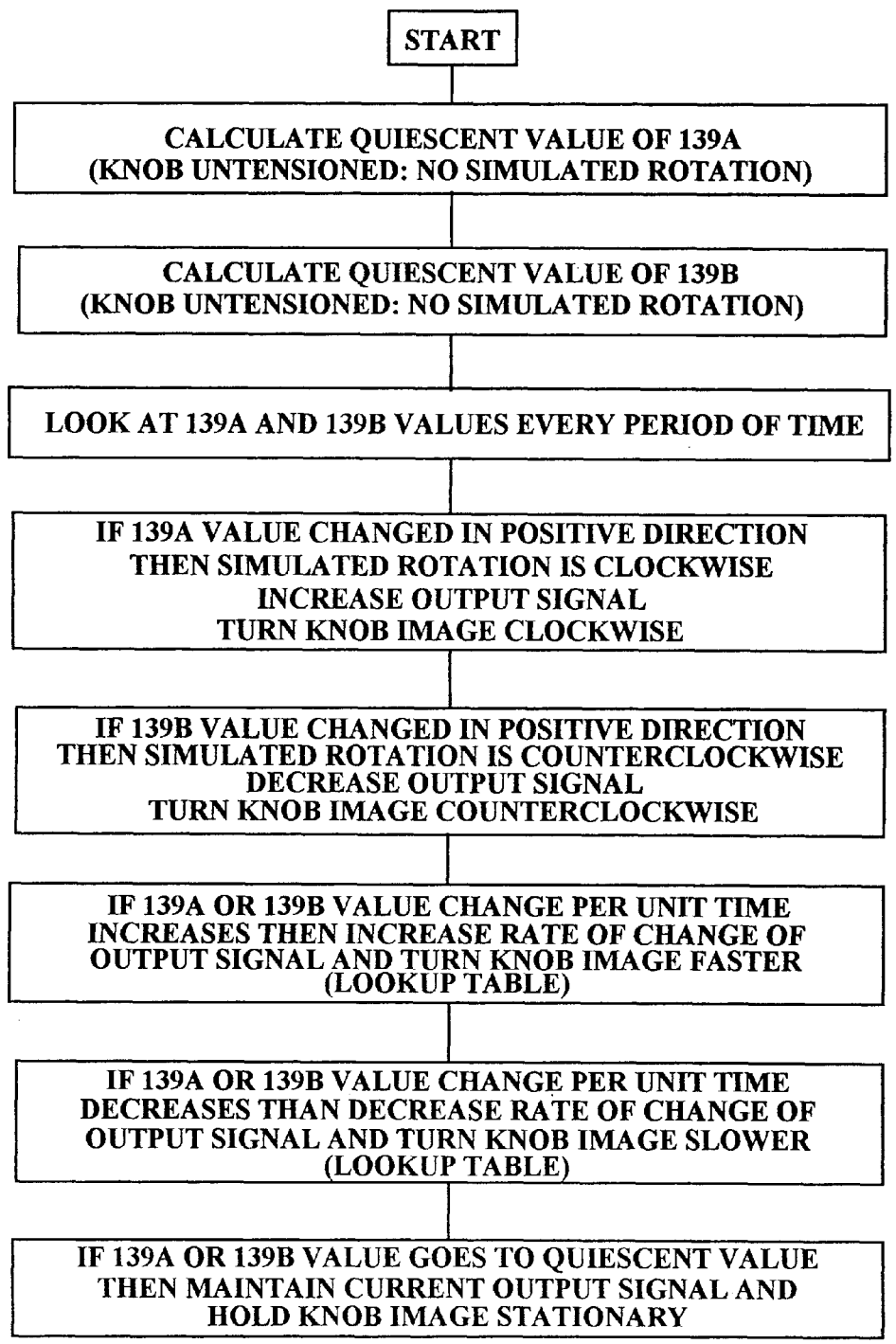
FIG. 26 depicts, in flowchart form, suitable programming for a digital data processor which is a component of the circuit of FIG. 25.

Referring to FIG. 26 in conjunction with FIGS. 22 to 25, the programming of microprocessor 148 calls for an initial calculation of the quiescent values of the resistances of the two load cells 139a and 139b, the quiescent values being the values which exist when no torsion force is being exerted on the shaft 133. The program then calls for repetitive detection of the resistance values of the two load cells 139a and 139b. If the resistance value of load cell 139a increases then the program increases the magnitude of the control signal that is being transmitted to the controlled circuit 153 and continues to increase the control signal as long as the increase in the resistance value of load cell 139a persists which condition indicates that the operator is continuing to apply torsion force to the shaft 133. If an increase in the resistance value of the other load cell 139b is detected the program decreases the magnitude of the outputted control signal and continues to do so as long as the increase of the resistance value at load cell 139b persists. The microprocessor monitors the rate of a resistance value increase or decrease at load cell 139a or 139b and increases or decreases the rate of change of the outputted control signal in a corresponding manner. The specific value of the control signal which is transmitted to the controlled circuit at any given time during this process is determined by reference to a lookup table which is internally configured within the microprocessor and which stores the sequence of control signal values that is to be transmitted to the controlled circuit at the different successive settings of the control device 132. When the resistance value at load cell 139a or 139b returns to the quiescent value following an increase, indicating that the operator has ceased to apply torsion force to shaft 133, the program maintains the outputted control signal value at the value which exists at that time.

The digital control signal which is produced by microprocessor 148 may be delivered directly to the circuit 151 which is being controlled if it is of a type that responds to digital control signals. Under that condition, the circuit control device 132 of FIGS. 22 to 26 acts as a rotary encoder. The control signal output of microprocessor 148 may be transmitted to the apparatus which is being controlled through a digital to analog signal converter 152 if the apparatus is of a type that responds to control signals in the form of a variable voltage. In that mode of operation the control signal device 132 acts as a rotary potentiometer.

Referring to FIGS. 24 and 25, a flat panel display controller 153, responsive to signals from microprocessor 148, causes the flat panel display 137 to display changeable graphics that assist the operator of the control device 132 and which may take different forms depending on the nature of the controlled circuit 153. The graphics may, for example, include a number indicating the current setting of the control device 132. In the present example, the graphics include an annular array of spaced apart radially directed calibration marks 150 that encircles the ase of the control device 132. The graphics further include a knob image which is a circular knob outline 155 situated in coaxial relationship with the actual knob 130 and which has an outwardly directed pointer image 155a at one location on the circular knob outline. Referring to FIGS. 24 and 26, the microprocessor programming causes the knob image including pointer 155a to turn in a clockwise direction during periods when the value of the outputted control signal is being increased in the previously described manner and to turn in a counterclockwise direction during periods when the outputted control signal is being decreased. The rate of turning of the knob image is matched to the rate of the increase or decrease in the outputted control signal. Thus the knob image provides a visual indication of the current setting of the control device 132 similar in appearance to a conventional control device having a knob which is actually turned by the operator.

The graphics which are displayed by the control device 132 can be changed instantly by the flat panel display controller if the device is a multiple function control such as the control devices which have been previously described with reference to the remote control unit of FIGS. 1 to 4.

Referring again to FIGS. 22, 23 and 24, this example of the control device 142 includes a cylindrical cap 154 fitted onto shaft 143 and which is bonded to the end portion 156 of the shaft that is opposite from the base 137 of the shaft. The cap 154 provides a bulkier surface for the operator to grasp and protects the load cells 139a and 139b from damage but is not essential in all instances as, in the absence of a cap, the control device 142 can be operated by directly grasping the shaft 133.

Figure 28:
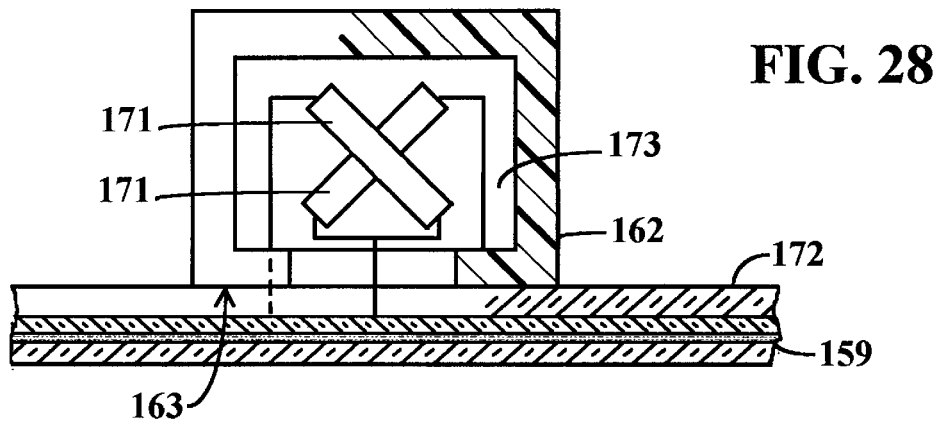
FIG. 28 is a section view taken along line 28—28 of FIG. 27.
Figure 27:
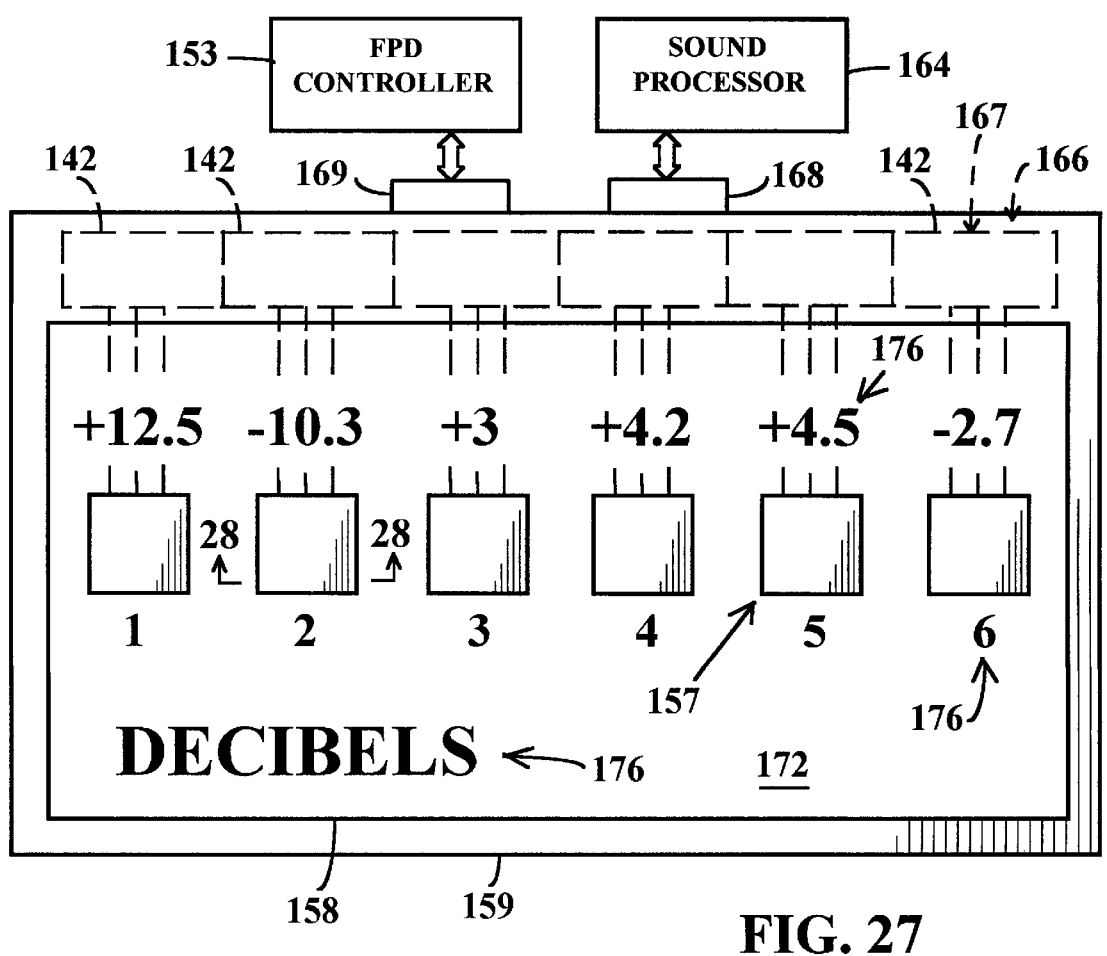
FIG. 27 is a front view of a bank of circuit control devices with changeable graphics which control devices have stationary control members that simulate controls of the kind having a slidable knob that is traveled along a track by an operator.

Some circuit control devices have a slidable knob that is traveled along a track in order to change the setting of the control device. Conventional controls of this kind have a bulky elongated track that is typically situated behind a control panel, the knob being secured to a stem which extends through a slot on the control panel. FIGS. 27 and 28 depict relatively compact circuit controls 157 which function in the manner of a sliding knob control without requiring a track. This makes the controls 157 particularly suitable for disposition within the image display area 158 of a flat panel display 159 or other electronic image display screen as it is not necessary to provide openings in the display screen 161 and the controls do not occupy an extensive area of the screen.

FIGS. 27 and 28 depict a bank of six spaced apart knobs 162 which are not moveable as the knobs have bases 163 which are bonded to a single flat panel display 159 within the image display area 158. In this example the depicted knobs 162 and associated circuitry function as faders which are coupled to a digital sound processor 164 to enable operator variation of sound intensities within the sound processor. Similar controls can be used to provide control signals to diverse other types of apparatus.

Sound processor 164, which may be of the known design, is coupled to a signal processing circuit 166 on an integrated circuit board 167 that is situated within the Marginal region of the flat panel display 159 and which is coupled to the sound processor 164 through a first multi-pin connector 168 at an edge of the display. A second multi-pin connector 169 enables coupling of the flat panel display controller 153 to the display 159. Each of the knobs 162 has a pair of crossed strain gauge load cells 171 bonded to the knob, the load cells being oriented to extend diagonally relative to the transparent cover plate 172 of the display 159. Preferably the knobs 162 are hollow and the load cells 171 are inside the knobs to protect the cells from damage. The load cells 171 are bonded to wall regions 173 within the knobs 162 that extend transversely at the image display area 158 of the display 159.

The signal processing circuit 166 may include six sub-circuits 142 each of which is similar to the circuit 142 which has been previously described with reference to FIG. 25 except insofar as one of the load cells 171 of FIG. 28 replaces load cell 139a of FIG. 25 and the other of the load cells 171 of FIG. 28 replaces the load cell 139b of FIG. 25. The controlled circuit 151 of FIG. 25 is, in this instance, the sound processor 164 of FIG. 28. Referring jointly to FIGS. 25 and 27, it is not essential to provide a separate microprocessor 148 and a separate flat panel display controller 153 for each of the sub-circuits 142 as a single microprocessor may process the signals arising from operation of any of the knobs 162 and all knobs are situated on a single flat panel display.

Referring again to FIGS. 27 and 28, the operator varies the volume of any of six different sounds that are being processed within the sound processor 164 by applying pressure to the particular knob 162 which controls the particular sound. Pressure in the direction of the top of the image display area 174 increases the electrical resistance of the load cells 171 and pressure in the opposite direction lowers the resistance. The signal processing circuit 166 responds by varying the control signal which it outputs for the operated knob in the manner which has been previously described with reference to the circuit of FIG. 25. The flat panel display controller 153 causes changeable graphics 176 to appear at the image display area 158 including at locations adjacent to each knob 162. The graphics may, for example, include labels identifying the sound track which each particular knob controls and an indication of the current setting of each knob.

Referring to FIG. 29, operation of a joystick 177 type of circuit control device 178 can be facilitated by providing instantly changeable graphics 179 in close proximity to the joystick that is manipulated by the operator. The joystick 177 of this example is a rod situated at the face of a flat panel display 180 within the area 181 at which images are displayed. The joystick 177 is formed of flexible material such as rubber or the like and has a base end 182 which is bonded to the transparent cover plate 183 of the flat panel display 180 with adhesive or by other means. The joystick 177 protrudes outward from the face of the display 180 in perpendicular relationship with the face of the display when the joystick is in an unflexed condition.

Flexing of the joystick 177 can be detected by any of a variety of different sensors. For example, strain gauge load cells and resistors that change resistance in response to applied forces are used for this purpose in joystick controls for laptop computers. This embodiment of the invention makes use of the Hall effect to generate a control signal in response to flexing of the joystick 177. For this purpose, a small magnet 184 is secured to the joystick 177 at a location which is away from the fixed base end 182 of the joystick. In the present example the magnet 184 is embedded in a handle region 186 of the joystick 177 at the end of the joystick that is opposite from the fixed base end 182. Flexing of the joystick 177 in any lateral direction by an operator is detected by a pair of Hall effect sensors 185a and 185b. The sensors are affixed to the transparent cover plate 183 near the base end 182 of the joystick and are at different locations around the perimeter of the base of the joystick, the sensors of this example being separated by an angular interval of 90° measured about the axis of the joystick. Flexing of the joystick 177 in any lateral direction changes the strengths of the magnetic fields at the two sensors 185a and 185b and thereby causes changes in the electrical resistances of the sensors. The two sensors 185a and 185b exhibit a pair of resistance values that are dependent on the direction in which the joystick 177 is flexed. A different and unique pairing of resistance values is produced when the joystick 177 is flexed in each different direction. This enables detection of flexing of the joystick 177 and the direction in which it is flexed by a signal processing circuit. The signal processing circuit may be similar to that previously described with reference to FIG. 25 except insofar as Hall effect sensor 185a of FIG. 29 replaces the load cell 139a of FIG. 25 and Hall effect sensor 185B of FIG. 29 replaces the other load cell 139b of FIG. 25. Microprocessor 148 of FIG. 25 is, in this case, provided with an internally configured lookup table wherein the resistance value pairs that identify each different direction that the joystick may be flexed are stored in conjunction with the control signal that is to be transmitted to the controlled circuit 151 when the joystick is flexed in that direction.

Referring to FIG. 30, the above described flexible joystick can be replaced with a rigid joystick 177a which is attached to the transparent cover plate 183 of the flat panel display by means 187 which enables tilting of the joystick in any lateral direction. In this example the joystick 177a has a spherical base end 188 which is seated in a conforming hemispherical cavity 189 in a socket member 191 that is adhered to the cover plate 183. The tiltable joystick 177a is held at socket member 191 by an annular retainer 192 which is also adhered to cover plate 183. Retainer 192 encircles the socket member and has an annular end wall 193 that encircles the spherical base end 188 of the joystick 177a in contact with the base end. The joystick 177a is biased towards an untilted orientation, at which it is perpendicular to the cover plate 183, by a compression spring 194. Spring 194 is disposed in coaxial relationship with the joystick 177a and extends between retainer end wall 193 and an outwardly directed flange 196 portion of the joystick 177a. Except as herein described the circuit control device 178a of FIG. 30 may be similar to the control device 178 of FIG. 29.

In a modification of the joystick control device, spring 194, flange 196 and retainer 192 are eliminated and, as shown in FIG. 31, are replaced with a resilient boot 197 formed of rubber or the like. The boot 197 is secured to cover plate 183 of the flat panel display and encircles socket member 19, base end 182 of the joystick and a portion 198 of the joystick shaft that is adjacent to the base end, the boot being proportioned to abut against the socket member and the base end 182 and portion 198 of the joystick 111a.

Figure 32:
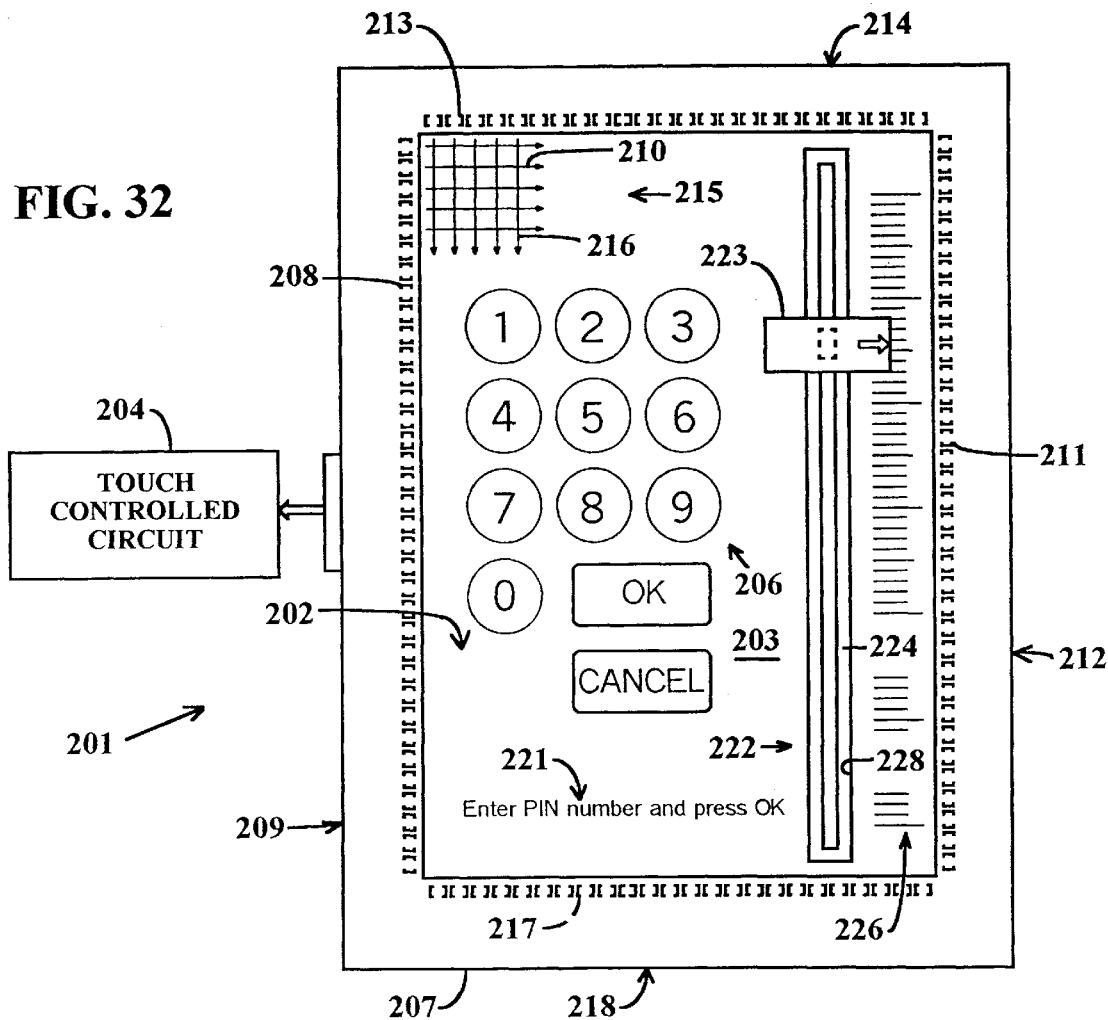
FIG. 32 is a frontal view of a touch screen control panel wherein touching of the panel by an operator is sensed by optical means and wherein a control device of the sliding knob and track type is provided on the panel without interfering with operation of the optical sensing means.
Figure 33:
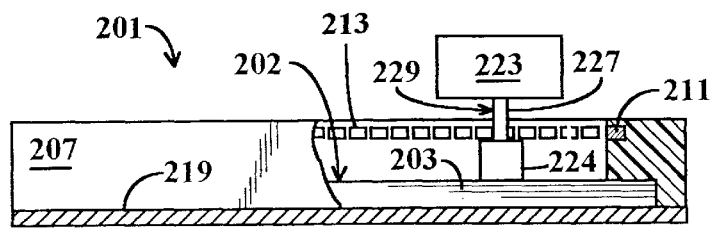
FIG. 33 is a broken out end view of the touch screen control panel of FIG. 32.

One known type of control panel for enabling operator entry of alphanumeric data and operating instructions to a controlled circuit uses infrared detectors to sense the location at which an operator touches a panel. Touch responsive control panels of this kind are used to control diverse types of electrical circuits. FIGS. 32 and 33 depict a control panel 201 of this kind which differs from the prior touch responsive control panels in that the surface which is touched by the operator's finger is the face 202 of a flat panel display 203 of the previously described type. This enables the locations which are to be touched to enter specific data or to initiate different operations in the controlled circuit 204 to be marked by graphics 206 which can change instantly when the mode of operation of the controlled circuit is changed or if the control panel is used to control more than one such circuit. For purposes of example FIG. 32 depicts location marking and identifying graphics 206 that are appropriate for a bank automatic teller machine but the graphics can differ in number, location and information content depending on the nature of the controlled circuit 204.

Referring again to FIGS. 32 and 33 in conjunction, the flat panel display 203 is bounded by a rectangular frame 207 which extends outward from the face 202 of the flat panel display 201. A first row of infrared energy emitters 208 extends along a first side 209 of frame 207, the emitters being positioned to direct spaced apart parallel beams 210 of infrared towards successive ones of a first row of infrared detectors 211 that extends along the opposite side 212 of frame 207. A second row of infrared energy emitters 213 extends along another side 214 of frame 207 and directs additional parallel spaced apart beams 216 of infrared towards detectors 217 of a second row of detectors that extends along the opposite side 218 of the frame. Thus the emitters 208 and 213 jointly create a grid 215 of infrared beams which is parallel to the face 202 of flat panel display 203 and which is situated in front of the face of the display. Insertion of an operator's finger into the grid 215 disrupts an infrared beam 209 and an orthogonally directed beam 216 thereby enabling detection of the X-Y coordinates of the location at which the operator has touched the face 202 of flat panel display 203. The touch detection and locating circuit to which the infrared detectors 211 and 217 are connected may be of the known form used in prior touch sensitive control panels of this general type and in this example is embodied in a circuit board 219 which extends along the back of the flat panel display 203. As is known to those skilled in the art, such circuits transmit different data and/or control signals to the controlled circuit 204 in response to touching of the panel at different predetermined locations thereon.

At prior control panels of this general type a flat panel display is often situated at a location adjacent to the touch panel to convey messages to the operator. The apparatus of FIGS. 32 and 33 enables display of such messages 221 at the face 202 of the touch panel itself.

Touching a particular location on the face 202 of the control panel 201 results in production of a predetermined specific signal that has been assigned to that location. Many controlled circuits 204 also require one or more control signals that can be selectively varied by the operator for any of diverse purposes such as varying sound volume or adjusting contrast at a display screen among other examples. One known form of control device 222 for producing a control signal that can be varied by an operator has a knob 223 that can be slid along a linear track 224 to vary the signal which control devices are variously called faders, linear potentiometers or by other names depending on the function and internal construction of the particular device. Heretofore control devices of this kind have been situated apart from but nearby the display screen with which they coact. The present invention enables a control device 222 of this kind to be secured to the face 202 of the display screen 203 within the image display area without disrupting the grid 215 of infrared beams that enables detection of the location at which an operator's finger touches the face 202 of the screen. This is an advantageous location for the control device 222 as the display screen 203 can then be used to display instantly changeable calibration marks 226 and/or other graphics which facilitate operation of the control device.

In control devices 222 of this kind the slidable knob or cap 223 is supported by a stem 227 which protrudes from the track 224 through a linear groove 228 that extends along the track. Components of the control device 222 of the present invention are proportioned to locate the track 224 between the infrared beam grid 215 and the face 202 of the display, to locate the knob 223 outward from the grid 215 and to cause the stem 227 to be in an intersecting relationship with the grid. At least the portion 229 of the stem 227 that intersects the infrared beam grid 215 is formed of infrared transparent material such as glass or transparent plastic for example. To avoid refractive effects, at least that portion 229 of the stem 227 has a rectangular cross section with two opposite sides of portion 229 being in a perpendicular relationship with infrared beams 210 and the other two sides of that portion being in a perpendicular relationship with infrared beams 216. Thus the control device 222 does not disrupt the infrared beams 210 and 216 and the beams are not distorted as they pass through the stem 227 of the device.

Figure 34:
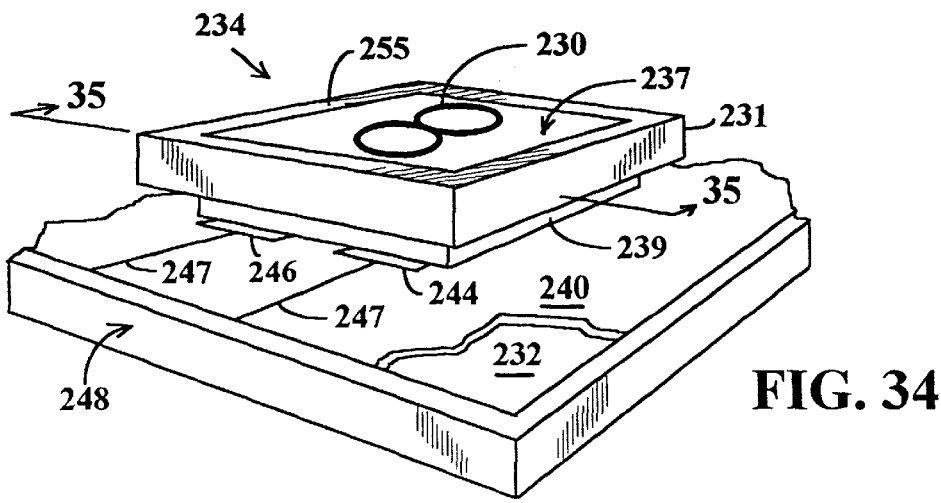
FIG. 34 is a perspective view of a corner region of a control panel for controlling electrical apparatus wherein instantly changeable labels produced by an underlying electronic display screen are perceived as being located on a switch cap.
Figure 35:
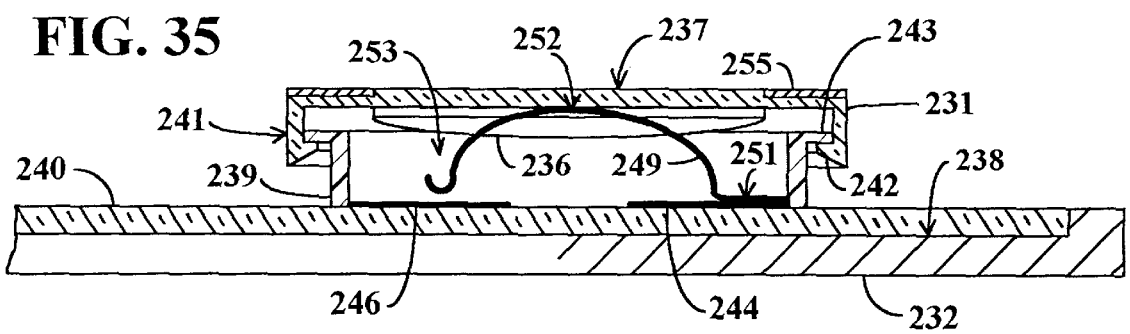
FIG. 35 is a cross section view taken along line 35—35 of FIG. 34.
Figure 36:
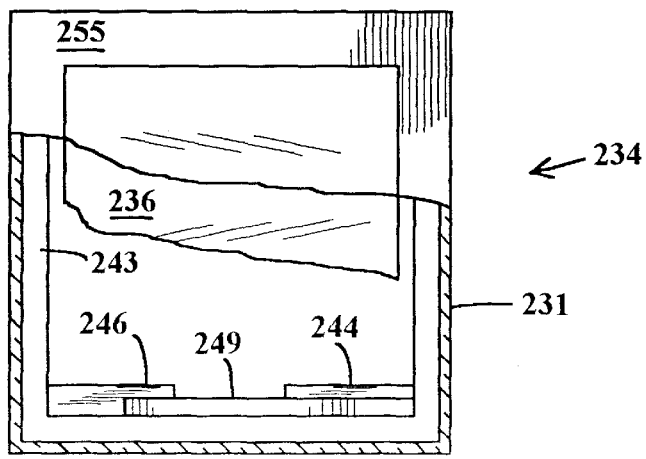
FIG. 36 is a broken out frontal view of a switch component of the apparatus of FIGS. 34 and 35.

An advantageous disposition of control switches on the face of an electronic display screen has been previously described with reference to FIGS. 12 to 20. In those previously described devices the display screen presents instantly changeable labels and/or other graphics at locations which are adjacent to the switch buttons. Referring now to FIGS. 34, 35 and 36, it is also possible to display such labels or other graphics 230 in a manner which causes them to appear be located on the switch button 231 itself. The display screen 232 displays the desired image at the area of the display screen that is directly behind the switch 234. At least a central region of the switch button 231 is formed of transparent material such as glass or transparent plastic to enable viewing of the image by an operator. A lens 236 magnifies the image by an amount which causes it to be perceived as being situated on the face 237 of the switch button 231, the degree of magnification that is needed for the purpose being dependent on the spacing of the switch button face 237 from the face 238 of the display screen 232.

In the specific example depicted in FIGS. 34, 35 and 36, the display screen 232 is a flat panel display of the previously described busbar driven kind. Switch 234 has a frame shaped base 239 which is adhered or otherwise fastened to a transparent cover plate 240 which overlays the face 238 of the display screen 232. Switch button 231 has a rectangular skirt 241 proportioned to fit around the base 239. The skirt 241 has a lip 242 which extends towards base 239 behind a flange 243 that extends outward from the sides of the base. The base 239 is formed of resilient material and flange 243 is sufficiently thin to enable it to deform momentarily as the switch button 231 is snap fitted onto the base 239.

Spaced apart layers 244 and 246 of conductive material are adhered to the cover plate 240 and function as the fixed switch contacts. Layers 244 and 246 extend for a limited distance within the base 239 and for a limited distance outside of the base 239 in the immediate vicinity of one side of the base. Thin conductors 247 extend along the cover plate 240 from the outside regions of the layers 244 and 246 to the marginal region 248 of the display screen 232 to connect the switch 234 with the circuit which is controlled by the switch. The conductors 247 are on the front surface of the cover plate 240 in this example but may extend along the undersurface of the cover plate and be connected with layers 244 and 246 by pins which extend through the cover plate as has been previously described.

Switch button 231 is urged outwardly from the cover plate 240 by a leaf spring 249 which also serves as the movable contact of the switch that interconnects contact layers 244 and 246 when the switch button is depressed by an operator. Leaf spring 249 has a fixed end 251 secured to layer 244, an arcuate center region 252 configured to bear against the inside surface of the switch button 231 face. A distal end 253 of the leaf spring 249 is spaced outward from layer 246 when the switch button 231 is in an undepressed condition. The distal end 253 of the spring 249 contacts the layer 246 to close the switch 234 when the button is depressed by an operator.

Magnifying lens 236 in this example is a separate component which is adhered to the inside surface of the face 237 of switch button 231 with transparent adhesive. Alternately, the face 237 region of the switch button 231 can itself be shaped to function as the lens.

In this example, an opaque border 255 is provided at the marginal region of the face 237 of the switch button 231 to make the otherwise transparent switch button more perceptible to the operator and to mask the base 239, contact layers 244 and 246 and leaf spring contact 249.

Banks of switches 234 of the kind described above can in many instances advantageously replace touch panels of the kind which detect an operators touch by sensing capacitive or resistive changes or by infrared beam disruption. Touch panels of these types do not provide any tactile feedback that enables the operator to sense closure of a switch. Many persons prefer to operate movable switch buttons which provide such tactile feedback.

While the invention has been disclosed with reference to specific embodiments for purposes of example, many modifications and variations are possible and it is not intended to limit the invention except as defined in the following claims.

We claim:

1. Apparatus for producing electrical circuit control signals, said apparatus having an elongated joystick with first and second opposite ends, the first end being movable by an operator in any of a plurality of different directions, said apparatus further having a signal producing circuit which produces a control signal in response to lateral movement of said joystick and wherein changeable graphics pertinent to operation of the apparatus are displayed at a screen of an electronic image display, wherein the improvement comprises:

said second end of said joystick being disposed in front of said electronic image display screen at an image display area thereof and being attached to said image display.

2. The apparatus of claim 1 wherein said apparatus further includes a magnet secured to said joystick at a location which is away from said second end thereof and wherein said signal producing circuit includes at least one Hall effect sensor secured to said image display at a location which is spaced apart from said joystick, and a signal processor electrically coupled to said Hall effect sensor and which outputs an electrical circuit control signal that varies in response to changes of the electrical resistance of said Hall effect sensor.

3. The apparatus of claim 2 wherein a pair of the Hall effect sensors are secured to said image display at locations which are spaced apart from said joystick and which are angularly spaced apart around said second end of said joystick, each of said Hall effect sensors being electrically coupled to said signal processor.

4. The apparatus of claim 1 wherein said second end of said joystick is fixedly secured to said image display, said joystick being formed at least in part of flexible resilient material.

5. The apparatus of claim 1 wherein said second end of said joystick is attached to said image display by a ball and socket joint, further including a resilient element positioned to urge said joystick towards a specific orientation relative to said image display screen.

6. The apparatus of claim 5 wherein said joystick has a flange thereon and wherein said resilient element is a compression spring encircling said second end of said joystick and abutting said flange.

7. The apparatus of claim 5 wherein said resilient element is a resilient boot encircling said ball and socket joint and encircling an adjacent portion of said joystick.

* * * * *